(12) United States Patent
Lopez et al.

(10) Patent No.: US 7,769,595 B2
(45) Date of Patent: *Aug. 3, 2010

(54) AUTOMATED PRICING AND/OR "GREEN" INDICATING METHOD AND SYSTEM

(75) Inventors: Douglas D. Lopez, Los Alamitos, CA (US); Robert L. Klug, Laguna Beach, CA (US)

(73) Assignee: California Distribution Center, Inc., Signal Hill, CA (US)

(*) Notice: Subject to any disclaimer, the term of this patent is extended or adjusted under 35 U.S.C. 154(b) by 171 days.

This patent is subject to a terminal disclaimer.

(21) Appl. No.: 12/011,270

(22) Filed: Jan. 25, 2008

(65) Prior Publication Data

US 2008/0195405 A1    Aug. 14, 2008

Related U.S. Application Data

(63) Continuation-in-part of application No. 12/004,187, filed on Dec. 20, 2007, which is a continuation-in-part of application No. 10/346,989, filed on Jan. 17, 2003, now Pat. No. 7,337,151.

(51) Int. Cl.
G06Q 99/00 (2006.01)

(52) U.S. Cl. ............... 705/1.1; 705/8; 705/28; 705/37; 705/400; 715/502; 715/513; 703/1; 700/97

(58) Field of Classification Search ........ 705/1, 705/7, 400, 8, 28, 37; 700/95, 97; 707/101; 715/502, 513; 703/1
See application file for complete search history.

(56) References Cited

U.S. PATENT DOCUMENTS 5,189,606 A   2/1993   Burns et al. ............. 364/401

(Continued)

FOREIGN PATENT DOCUMENTS

JP    2001/357075 A    12/2001

(Continued)

OTHER PUBLICATIONS

Provional application 60/999785.*

(Continued)

*Primary Examiner*—John W Hayes
*Assistant Examiner*—Freda A Nelson
(74) *Attorney, Agent, or Firm*—Roberta L. Hastreiter; Locke, Lord, Bissell & Liddell LLP

(57) ABSTRACT

Methods and systems for a rapid and automated creation of a price schedule and a "green" schedule comprising steps and an implementation for providing a set of construction plans created with an architectural software design tool, and a palette of architectural parametric symbols corresponding to respective construction plan elements, such as windows. At least one parametric symbol corresponding to a construction plan element is inserted into the construction plans. A cost value and a statement indicating whether or not a parametric symbol is "green" for each of the inserted parametric symbols is determined corresponding to respective plan elements. A price schedule, a "green" schedule or both are then created, which can include the total cost for all of the inserted parametric symbols, and a statement for each of the inserted symbols indicating whether or not they are certified as being energy efficient or rated "green."

88 Claims, 22 Drawing Sheets

U.S. PATENT DOCUMENTS

| | | | | |
|---|---|---|---|---|
| 5,307,261 | A | 4/1994 | Maki et al. ................... | 364/401 |
| 5,570,292 | A | 10/1996 | Abraham et al. ........ | 364/473.01 |
| 5,761,674 | A * | 6/1998 | Ito ..................................... | 1/1 |
| 5,893,082 | A * | 4/1999 | McCormick ................ | 705/400 |
| 5,918,219 | A | 6/1999 | Isherwood .................... | 705/37 |
| 6,002,855 | A | 12/1999 | Ladner et al. .......... | 395/500.01 |
| 6,037,945 | A * | 3/2000 | Loveland ....................... | 345/420 |
| 6,038,547 | A | 3/2000 | Casto ....................... | 705/30 |
| 6,324,508 | B1 | 11/2001 | Finney ....................... | 704/246 |
| 6,393,410 | B1 * | 5/2002 | Thompson ................... | 705/37 |
| 6,446,053 | B1 * | 9/2002 | Elliott ......................... | 705/400 |
| 6,581,040 | B1 * | 6/2003 | Wright et al. ................. | 705/8 |
| 6,681,140 | B1 * | 1/2004 | Heil ............................. | 700/95 |
| 6,810,401 | B1 * | 10/2004 | Thompson et al. .......... | 707/101 |
| 6,826,516 | B1 | 11/2004 | Ito ............................... | 703/1 |
| 6,854,218 | B2 | 2/2005 | Weiss ......................... | 52/79.1 |
| 6,859,768 | B1 * | 2/2005 | Wakelam et al. .............. | 703/1 |
| 6,922,701 | B1 * | 7/2005 | Ananian et al. .......... | 707/104.1 |
| 7,283,975 | B2 * | 10/2007 | Broughton ................... | 705/28 |
| 2001/0047250 | A1 | 11/2001 | Schuller et al. | |
| 2001/0047251 | A1 | 11/2001 | Kemp | |
| 2002/0016725 | A1 * | 2/2002 | Eichstaedt et al. ............. | 705/7 |
| 2002/0026343 | A1 | 2/2002 | Duenke | |
| 2002/0035408 | A1 * | 3/2002 | Smith ......................... | 700/97 |
| 2002/0099617 | A1 | 7/2002 | Fogelson | |
| 2002/0103557 | A1 | 8/2002 | Land | |
| 2003/0050871 | A1 | 3/2003 | Broughton | |
| 2003/0097240 | A1 | 5/2003 | Atasoy | |
| 2003/0139995 | A1 | 7/2003 | Farley | |
| 2004/0049739 | A1 * | 3/2004 | McArdle et al. ............ | 715/513 |
| 2004/0143424 | A1 | 7/2004 | Lopez et al. | |
| 2004/0205519 | A1 * | 10/2004 | Chapel et al. ............... | 715/502 |
| 2005/0038636 | A1 | 2/2005 | Wakelam et al. | |
| 2005/0080502 | A1 * | 4/2005 | Chernyak et al. ............. | 700/97 |
| 2006/0277007 | A1 | 12/2006 | Wakelam et al. | |
| 2008/0077364 | A1 | 3/2008 | Wakelam et al. | |
| 2008/0167971 | A1 | 7/2008 | Lopez et al. | |
| 2008/0249756 | A1 * | 10/2008 | Chaisuparasmikul ........ | 703/13 |

FOREIGN PATENT DOCUMENTS

| | | | |
|---|---|---|---|
| JP | 2004062601 A | * | 2/2004 |
| WO | WO 01/08269 A2 | | 1/2001 |
| WO | WO 01/29634 A2 | | 4/2001 |
| WO | WO 01/55831 A1 | | 8/2001 |
| WO | WO 01/67372 A1 | | 9/2001 |
| WO | WO 01/88740 A1 | | 11/2001 |
| WO | WO 02/13108 A1 | | 2/2002 |
| WO | WO 02/29518 A2 | | 4/2002 |
| WO | WO 02/070989 | | 9/2002 |
| WO | WO 03/062957 | | 7/2003 |

OTHER PUBLICATIONS

"Timberline CAD Integrator Uses IFC Standard to Create Cost Estimates Directly From CAD Designs in Record Time", Mar. 4, 2002, 10.aeccafe.com, 2 pgs.*

Swanson, John. G., "E Business Evolving Rapidly", Mar. 2001, Window and Door, 6 pgs.*

California Distributor Selling Windows on Line, Sep. 2000, Window and Door, 2 pgs.*

Goldberh, H. Edward, "BIM Update 2006—How Complete is the Building Information Model?", Nov. 2006, cadalysts, vol. 23, No. 11, p. 50.*

John G. Swanson, (Editor) "E. Business Evolving Rapidly," Mar. 2001, Window & Door, 8 pages.

"California Distributor Selling Windows On Line," Sep. 2000, Window & Door, 2 pages.

Activewin.com.

EPIC Electronic Product Information Corp., Product Brochures, Apr. 1997.

EPIC Product Information Corp., Technology, Software Brochure, May 1992.

EPIC Electronic Product Information Corp., Quick Reference Technology Demo, Mar. 1995.

Edgenet Media, Made 2 Order, Brochure, Rev. Jul. 28, 1998.

* cited by examiner

Account Name
tester
Log Out

Change Quote
View Quote
Alter Quote
View All Quotes
Create New Quote
Compare Prices
Prepare a Quote

Current Quote

Name: 1stPricing Reference #6519035

State: California
Change State

Number of Items: 4

Total: $1074.13

AUTOMATED PRICING AND/OR "GREEN" INDICATING METHOD AND SYSTEM

FIELD OF THE INVENTION

This application is a continuation-in-part non-provisional patent application of pending non-provisional patent application U.S. Ser. No. 12/004,187, filed on Dec. 20, 2007 ("second continuation-in-part patent application"), which is a continuation-in part non-provisional patent application of non-provisional patent application U.S. Ser. No. 10/346,989, filed on Jan. 17, 2003 now U.S. Pat. No. 7,337,151 ("first continuation-in-part patent application"). This continuation-in-part patent application claims the benefit of prior non-provisional patent applications U.S. Ser. No. 12/004,187, filed on Dec. 20, 2007, and U.S. Ser. No. 10/346,989, filed on Jan. 17, 2003, both of which patent applications are hereby incorporated into this continuation-in-part patent application in their entireties by reference.

BACKGROUND OF THE INVENTION

1. Background

In a typical construction design, a set of construction plan drawings are generated, usually with a computer-implemented tool, such as an architectural CAD (Computer Aided Design) software product. Disadvantageously, the various elements and materials of the construction project, for example, windows, doors, skylights, acrylic glass blocks and the like, are priced out in estimating the cost of the job in a completely separate process, and usually only by one manufacturer. This separate process very disadvantageously adds a significant amount of time and effort to the process of generating a construction job price. Also very disadvantageously, because different construction materials of varying quality and cost can generally be used on the same construction job or project, the cost amounts that are set forth on a price schedule that is generated by this separate process can vary by a very wide margin. Further, and also disadvantageously, in the event that the price schedule needs to be changed, for example, due to cost overruns, competitive bidding and/or other factors, a new price schedule must be generated, with an additional significant investment of time and effort involved for each such revision. Again, this ads a significant amount of extra expense to a construction project, and this typical process limits the flexibility in selected various construction materials for contractors and end-use customers.

It is important to provide a price, rather than an estimate, for a proposed construction project. In order for a bank (or other lending institution) to approve a construction loan for a proposed construction project, the bank generally requires an accurate price for the construction project, and will not rely upon an estimate, because estimates are often extremely inaccurate. If a bank does accept an estimate, and the estimate turns out to be lower than the final price for the construction project, the bank, which has control in such a situation, may then additionally charge large points and/or fees for the construction loan, substantially raising the price of the construction project, which is very undesirable. If the estimate turns out to be lower than the final price, this often results in construction cost overruns, construction time delays and dissatisfaction of customers.

Most of the time when architectural plans are drawn, the plans are drawn inaccurately. If an architectural plan is drawn inaccurately, and a price is provided for a corresponding construction project, this situation generally presents significant problems with respect to construction cost overruns, construction time delays and the satisfaction of customers (homeowners or building owners).

Further, architects and other building designers that are interested in designing energy efficient and/or water efficient buildings currently have to manually look up (in books or various web sites) whether or not each different construction plan element, object, item and/or appliance that is to be used in the building, such as a bamboo floor, a concrete floor, other flooring, a window, a door, a skylight, an acrylic glass block, insulation, a roof, a fireplace, appliances, electrical fixtures, plumbing fixtures, drywall, heaters, forced air units, air conditioners, lumber, laminants, molding, siding, engineered lumber products, carpet or the like, is environmentally responsible, has a U.S. "Energy Star" label or is otherwise certified by a third party individual or entity as being "green." The plan drawer then has to describe this on the building plan. Disadvantageously, this process is extremely labor intensive and time consuming, often resulting in plan drawers simply not doing this.

To design a "green" building typically costs about 2% more than designing a building that is not "green." However, this additional cost typically pays itself back more than 10 times during the estimated 20 year life span of a building by saving money in energy and/or water costs, resulting in a huge long-term energy cost savings for the building owner (in heating, cooling, lighting, water heating, lawn watering, water and sewer costs and the like). Further, the "green" building design is most effective when architects and contractors integrate "green" energy and/or water efficient features into the building design as far in advance as possible, thereby making the building to be constructed the highest performing building possible. Moreover, the designing of a "green" building is very beneficial for the welfare of our planet. Energy consumption from information technology is known to be a major contributor to global warming, and significant resulting changes in the weather (massive hurricanes, sunamis, droughts, glacier meltings and the like).

It was a goal of the present invention to solve the above-described problems.

2. Description of the Art

Wakelam et al. (U.S. Pat. No. 6,859,768 B1) describe a computer-implemented automated building design and modeling system ("DMES system") that includes a database (column 4, lines 30-32) that provides a central source for all design and construction information for a construction project (abstract, column 1, lines 57-67, and claim 1). Ordinary elements and massing elements are assembled into a building model according to a sequential assembly hierarchy, "thus assembling a complete building model automatically . . . " (abstract and claim 11). Software for a commercially-available "cost estimating system" (represented as 112 in the figures), as well as software for several other systems that may be employed in a network implementation of the DMES system, is stored on a hard drive of a computer (FIG. 1 and column 7, lines 45-62). The "cost estimating system" produces a cost estimate (not a price), which is implemented using Ice 2000 computer software.

In contrast with the present invention, Wakelam et al. do not describe the production of a "price quote" or a "price schedule," or of information in connection with the environmental responsibility of a building. It is clear from a detailed review of Wakelam et al. that the systems and processes described therein only produce an estimate (a "cost estimate"), which is for a production of an entire building. (See, for example, FIG. 2g, 2h, 2i, 2j, 2k and 6b, the abstract, Appendix A, and column 1, lines 51-54, column 3, lines 42-46, column 7, lines 37-43, column 9, lines 8-31, and the claims of Wakelam et al.).

The "cost estimating system" that is described by Wakelam et al. for producing cost estimates is one of several different systems that are implemented with the DMES system described therein, and is a known computer software named "Ice 2000" that is commercially available from $MC^2$ Management Computer Controls, Inc., and described on the $MC^2$ Management Computer Controls, Inc. mc2-ice web site (column 7, lines 55-58).

Also, in contrast with the present invention, Wakelam et al. does not describe an ability to determine a price quote or price schedule for only one or two construction plan elements, such as only a window, or only a window and a door. It is clear from a detailed review of Wakelam et al. (including FIGS. 1-6) that the processes and systems that are described therein only provide a "cost estimate" (only a "ball park" figure regarding what the actual cost of designing and building a building may be) for the production of an entire building (i.e., not for individual construction products, such as a window, a door, an acrylic glass block, a sky light or the like). The cost estimate for the entire building includes cost estimate data for a wide variety of materials, components and labor, such as electrical devices, equipment and wiring, lights, HVAC systems, elevators, and man hours of labor involved in the fabrication of the building, as well as construction products, such as windows and doors.

As a result of the above difference, the methods and systems of the present invention are advantageously much more versatile than the methods and systems that are described by Wakelam et al. For example, the present invention can be employed in small or large residential or commercial remodeling construction projects, as well as for constructing entire new residential or commercial buildings. In contrast, the methods and systems described by Wakelam et al. can only be used for the construction of an entire new building.

Also in contrast with the present invention, Wakelam et al. does not describe a process or system having a plug-in (add-on) computer software code that runs as an internal component within a software design tool on a local computer, such as architectural CAD, but rather uses a stand alone, interview-based system, and a commercially available cost estimation software named Ice 2000. It is clear from a detailed review of Wakelam et al. that the processes and systems that are described therein are stand-alone processes and systems that can work in a network along with the DMES system.

Moreover, Wakelam et al., which describe a very complicated system that is employed to construct an entire building using a series of multiple tiers and hierarchies, teach away from the use of architectural CAD (a software design tool) by stating the following at Column 4, Lines 38-59, and Column 18, Lines 7-23, respectively:

" . . . In contrast to a conventional CAD tool, which uses software algorithms that scan and sort the locations and extents of all three-dimensional primitive geometries in a building model and compares all of the locations thereof for potential overlaps, the DMES system of the present invention performs clash detection, or interference checking, by cross-checking the location and extents of a current instance of an object against only those other existing instances in the model, i.e., the spatial database, and adjusting its position if necessary before assembling it into the model. This automatic clash detection is part of the assembly code included in each massing element and each element uses its own specific functions to determine the parameters of a clash and the rules by which to reposition the instance. This process has a small incremental impact on the speed of the assembly process, but completely removes the need for a series of long clash detection exercises after the model is complete."

" . . . In contrast to a conventional CAD tool, which uses software algorithms that scan and sort the locations and extents of all three-dimensional primitive geometries in a building model and compares all of the locations thereof for potential overlaps, the DMES system of the present invention performs clash detection, or interference checking, by cross checking the location and extents of the current instance against only those other existing instances in the model and adjusting its position if necessary before assembling it into the model. This automatic clash detection is part of the assembly process in each massing element and each element uses its own specific functions to determine the parameters of a clash and the rules by which to reposition the instance. This process has a small incremental impact on the speed of the assembly process, but completely removes the need for a series of long clash detection exercises after the model is complete."

Further, in contrast with the present invention, Wakelam et al. does not describe a process or system that employs a zip code of a construction site to access price data from a web site on a remote server system. Wakelam et al. does not describe a process or system that employs a web site that includes price data for a purchase of one or more construction plan elements in a geographical location within a zip code. Further, in contrast with the "cost estimates" described by Wakelam et al., the price data described herein can be relied upon to purchase one or more construction plan elements.

In contrast with the processes and systems of the invention, the processes and systems that are described by Wakelam et al. are very complicated (perhaps because an entire building is being assembled), and include an assembly hierarchy having five or more tiers.

Further, Wakelam et al. do not describe: (a) an insertion of a price schedule into a construction plan; (b) a price schedule that contains a list of construction plan elements with corresponding price quotes; (c) a placing of an order to purchase one or more construction plan elements; (d) a placing of an order to purchase one or more construction plan elements using a local computer or a web site on a remote server, or both; (e) a placing of an order to purchase one or more construction plan elements using a credit card and a local computer or a web site on a remote server, or both; or (f) a creation of a price schedule including one or two construction plan elements.

U.S. Pat. No. 6,446,053 B1 (Elliott) describes a computer-implemented method and system for producing a proposal for a construction project (title). The system includes a central site with various databases and a user site connected for electronic communication over a networked communication system such as the Internet (abstract). The user site includes a computer having stored in memory an application that enables a user to develop a construction proposal including a detailed graphical model and a detailed cost estimate model, have the proposal submitted electronically over a networked communication system to a construction professional for a bid, and receive a response on the proposal from the construction professional over the networked communications system (abstract). The application educates the user as it guides the user through a series of construction phases and steps, prompting the user to input critical information and make appropriate selections throughout the series of phases and steps (abstract). The method and system provide a proposal and a cost "estimate," not a final price (abstract).

In contrast with the methods and systems of the present invention, Elliott: (1) does not employ a plug-in (add-on) computer software code that runs as an internal component within a software design tool on a local computer, such as architectural CAD (but rather uses a stand alone, interview-based system); (2) does not insert parametric symbols into a construction plan; (3) does not, using an add-on computer software code, transmit data corresponding to inserted parametric symbols from a local computer over the Internet to a remote server system; (4) use a zip code and an add-on computer software code to access price data from a web site on a remote server system; (5) determine from price data a price quote for each of several construction elements, but rather provides only a cost estimate; or (6) provide information in connection with the environmental responsibility of a building, building component or building material.

Both Wakelam et al. and Elliott use stand alone computer software for cost estimation that does not include an add-on (plug-in) computer software code. Wakelam et al. uses commercially available Ice 2000 (column 7, lines 55-58), and Elliott uses a software package (not named) that is "preferably installed on the hard disc of a user's computer" (column 5, lines 25-27).

Further, Elliott does not teach or suggest the creation of a construction plan using a software design tool, such as architectural CAD. In contrast, Elliott describes (col. 6, lines 43-50, and col. 10, lines 20-24) the scanning of a photograph or construction plan into a user's computer to produce a digital image, which is a completely different process.

Additionally, the systems of both Wakelam et al. and Elliott provide only an "estimate" for the products described therein, and not a final price. This is a very important distinction between the present invention and the teachings of Wakelam et al. and Elliott. For the reasons that follow, it is important to obtain a price, rather than an estimate. Generally, lending institutions will not rely upon an "estimate" when considering whether or not to make a construction loan because estimates are often extremely inaccurate, and such inaccuracy often results in large construction cost overruns and significant construction time delays. Further, a price is binding upon the person or entity that provides the price, whereas an estimate does not bind a person or entity to a particular price. Therefore, a person or entity that provides a price must honor their price (or may be sued for not doing so), even if the construction job for which the price was quoted ends up costing significantly more money than the price quoted, causing the person or entity that quoted the price to lose a significant amount of money. This is not true of an estimate, which does not bind a person or entity to a particular price. As can be seen, it is significantly more risky to provide a price in comparison with an estimate, which is the reason why contractors generally only provide estimates (i.e., they do not want to be bound to a particular price). Further, it is a much more complex process to provide a price (an assigned amount of money that is required to be paid in order to make a purchase) in comparison with an estimate (a rough calculation). Elliott itself acknowledges this fact by stating, "Calculating the material quantities and costs [of large construction projects] can be very complicated" (column 1, lines 25-26).

Moreover, neither Wakelam et al. nor Elliott teach or suggest the use of a zip code to determine price data for one or more construction plan elements. Although Elliott discusses zip codes, such discussion only relates to the average labor rate, the average price of land, the average cost of builder's risk insurance and building permit costs, not to construction plan elements (col. 4, lines 44-62). The foregoing items are completely different from construction plan elements, and the pricing of the foregoing items would be completely different from the pricing of construction plan elements.

In contrast with the present invention, neither Wakelam et al. nor Elliott teach or suggest any of the following:

(1) inserting a price schedule into a construction plan;

(2) a price schedule that contains a list of construction plan elements with corresponding price quotes;

(3) the use of a CAD (Computer Aided Design) software product to create a construction plan;

(4) an add-on computer software code that imbeds a price schedule into a construction plan;

(5) the creation of a price schedule that includes one or two construction plan elements;

(6) a plug-in (add-on) computer software code and a web site that permit a user to place an order to purchase one or more of the construction plan elements that are present in a price schedule; or (7) a plug-in (add-on) computer software code and a web site that permit a user to automatically receive information in connection with the environmental responsibility of a building, building component or building material.

U.S. Pat. No. 6,810,401 B2 (Thompson et al.) describes an automated configuration system (and method) for facilitating the configuration of desired products, services, or other assemblages that require users to gather and assimilate disparate knowledge of makes, models, types, features, codes, and prices of the desired product/service to be configured (abstract). In accordance with a preferred embodiment, configuration is facilitated through interaction of a user with a frame engine that performs frame-based inferences to discern stored knowledge of a product (or the like), as supplemented by a rules-based inference system (column 1, lines 30-34).

In contrast with the methods and systems of the present invention, Thompson et al. describe a configuration system that does not use a plug-in (add-on) computer software code that runs as an internal component within a software design tool on a local computer, such as architectural CAD. Further, a construction product, such as a window or door, cannot be drawn in architectural CAD using the Thompson et al. system because the Thompson et al. system does not work in architectural CAD. In contrast, a construction product may only be cut and pasted into architectural CAD (in the same manner that a picture can be cut and pasted into a Word document). The configuration system of Thompson et al. is just drawing a picture on a computer. Moreover, the Thompson et al. system can only provide a price for one type of a construction product, such as a window, at a time, and provides a very slow process for providing such price. For example, in contrast with the methods and systems of the present invention, the system of Thompson et al. cannot provide a price for both a window and a door at the same time, or using the same computer software. Very disadvantageously, the Thompson et al. system must use a different type of software for each different type of construction product, for example, four different softwares for a window, a door, an acrylic glass block and a sky light, which is very time consuming and expensive.

In contrast with the Thompson et al. system, the system of the present invention uses a plug-in (add-on) computer software code that runs as an internal component within a software design tool on a local computer, such as architectural CAD. A product, such as a bay window, can be drawn in architectural CAD, and may then be imbedded into a wall of a room or structure, such as a Great Room. The window gets sized, and then is "burned" into a wall, so that one can clearly see exactly what the window will look like when it is added to the room and embedded into the wall. The "burning" of the window into the wall is a function of the plug-in (add-on) computer software code that runs as an internal component within the architectural CAD program. The system that is described by Thompson et al. does not do this. Such system is not working in architectural CAD. Further, with the system of the present invention, changes may be made to the window (while embedded into the wall in a room), and the changes to the window can then be clearly viewed (while the window is embedded into the wall in a room). This system can provide a price (a final price, and not an estimate) very rapidly for one or more different types of construction or other products, which is "tricky" (i.e., not easily accomplished). With the methods and systems of the present invention, it is possible to obtain a price for a construction product, such as a window or door, from as many as fifteen or more different manufacturers at the same time. Further, the present invention uses a zip code to obtain, and provide, price data for the purchase of one or more construction products, which includes a subtotal, tax and a final price. Very advantageously, the construction products can be purchased the same day (i.e. immediately).

None of Thompson et al., Wakelam et al. or Elliott teach or suggest any of the following steps, elements or limitations of the methods and systems of the present invention:

(1) using an add-on (plug-in) computer software code that runs as an internal component within a software design tool on a local computer;

(2) an insertion of parametric symbols into a construction plan;

(3) using the add-on computer software code, transmitting data corresponding to each inserted parametric symbol from a local computer over the Internet to a remote server system;

(4) using a zip code and an add-on computer software code to access price data from a web site on a remote server system;

(5) creating a price schedule from price quotes; or (6) a plug-in (add-on) computer software code and a web site that permit a user to automatically receive information in connection with the environmental responsibility of a building, building component or building material.

Further, Thompson et al. does not teach or suggest: (1) providing a construction plan on a local computer; (2) creating a construction plan with a software design tool; or (3) providing on a local computer a palette that includes at least one parametric symbol.

The products that are described by Thompson et al. cannot be drawn in an architectural CAD (or other) software design tool. In contrast, they may only be assembled in such a tool by an architect (a different user with a different computer). With the use of human intervention (i.e. no automation), drawings that are created by the Thompson et al. system can be sent or exported to an architect, for example, using e-mail, and the architect can then cut and paste the drawings into an architectural CAD program that the architect is using. The Thompson et al. system merely allows one to cut and paste drawings of products into a CAD program. For example, a window could be drawn in Microsoft Word using its drawing tools, and such drawing could be considered to be a CAD drawing because it is a "computer assisted drawing" (i.e., a computer assists a user in drawing the window). Further, the drawing could be e-mailed to an architect to be inserted into an architectural CAD program. However, in contrast with the methods and systems of the present invention, the user is not working in an architectural CAD program, and the drawing is not an add-on to an architectural CAD program.

In contrast with the above, the methods and systems of the present invention perform one or more sets of operations in a software design tool, such as architectural CAD, using an add-on (plug-in) computer software program. With this invention, no human intervention is required or desired (i.e., it is automated), and drawings can be "burned" (inserted) into a construction plan that has been designed using an architectural CAD program (or other software design tool).

Further, the Thompson et al. system can only be employed with one single product type, such as a window, whereas the methods and systems of the present invention can draw and price multiple different projects, such as a window, a door and an acrylic glass block, and rapidly provide comparison pricing for the various products from multiple different manufacturers.

Moreover, like Wakelam et al. and Elliott, Thompson et al. does not teach or suggest the use of a zip code to determine price data for one or more construction plan elements. Additionally, Thompson et al. do not teach or suggest:

(1) placing an order to purchase one or more of the construction plan elements that are present in a price schedule (because no price schedule is created by Thompson et al.); or (2) a system wherein an add-on (plug-in) computer software code and a web site permit a user to place an order to purchase one or more construction plan elements.

U.S. Patent Application Publication No. 2001/0047250 A1 (Schuller et al.) describes a computer-implemented method of visualizing a decorating project (abstract). The method includes rendering an image of a building space (e.g., a room) that includes a number of structural objects (such as doors, walls, and furniture) (abstract). The structural objects may be portrayed in the rendered image with visual characteristics that are determined by decorative materials (such as paint, fabric, or wallpaper) associated with the objects (abstract). Schuller et al. also describe a computer-implemented decorating system that includes a server operatively coupled to a memory, a database, and a network over which data can be exchanged with client computers (abstract). The memory includes software instructions to configure the server to retrieve modeling software from the database in response to requests from client computers, and to send the modeling software over the network to the client computers (abstract). The modeling software includes instructions to configure the client computers to model structural objects, to associate decorative materials with the structural objects, and to render an image of a building space (abstract). The rendered image portrays structural objects in accordance with visual characteristic of associated decorative materials (abstract).

In contrast with the methods and systems of the present invention, the decorating system of Schuller et al.: (1) does not employ a plug-in (add-on) computer software code that runs as an internal component within a software design tool on a local computer, such as architectural CAD but, rather, uses a stand alone computer program; and (2) does not employ a zip code to provide any prices. Although Schuller et al. state that their implementations can include automated purchasing [of structural objects and decorative materials], Schuller et al. do not describe how this may be accomplished.

None of Thompson et al., Wakelam et al., Elliott or Schuller et al. teach or suggest any of the following steps, elements or limitations of the present invention:

(1) using an add-on (plug-in) computer software code that runs as an internal component within a software design tool on a local computer;

(2) an insertion of parametric symbols into a construction plan;

(3) using the add-on computer software code, transmitting data corresponding to each inserted parametric symbol from a local computer over the Internet to a remote server system;

(4) using a zip code and an add-on computer software code to access price data from a web site on a remote server system;

(5) creating a price schedule from price quotes; or (6) a plug-in (add-on) computer software code and a web site that permit a user to automatically receive information in connection with the environmental responsibility of a building, building component or building material.

Additionally, Schuller et al. do not teach or suggest: (1) providing a construction plan on a local computer; (2) creating a construction plan with a software design tool; or (3) providing on a local computer a palette that includes at least one parametric symbol.

The teachings of Schuller et al. are clearly limited to the visualization of a decoration project (page 1, paragraphs [0006] and [0007]), and do not discuss construction projects.

Further, the "input images" that are discussed by Schuller et al. are obtained using a "digital image capture device," such as a scanner, digital camera or video signal capture device, and not a software design tool, such as CAD (page 1, paragraph [0009]).

The method and system of Schuller et al., which are drawn to the decoration of a room with, for example, paint, wallpaper and fabric (page 2, paragraphs [0023] and [0028]), are much simpler, and quite different, in comparison with the methods and systems of the present invention, which are drawn to construction projects, and the pricing of one or more construction elements. Such pricing is quite "tricky" (i.e., is not easily accomplished).

Like Wakelam et al., Elliott and Thompson et al., Schuller et al. do not teach or suggest the use of a zip code to determine price data for one or more construction plan elements.

While Schuller et al. do discuss an automatic purchasing of furnishings and decorating materials (page 5, paragraph [0049], page 7, paragraph [0067], and claims 11, 12, 29 and 30), Schuller et al. do not specify the mechanism that is employed to procure pricing for such purchasing. The teachings that are present in Schuller et al. regarding an automated purchasing are very vague.

Moreover, Schuller et al. do not teach or suggest the use of an add-on (plug-in) computer software code to a software design tool that permits a user to pay for an order using a credit card.

A need in the architectural and/or construction industries currently exists for rapidly, efficiently and cost-effectively generating, and modifying, a set of construction plans for one or more construction elements, and a corresponding price quote schedule for such construction elements, in one general process, wherein a user can rapidly procure one, two, three, four, five or more comparative prices from one, two, three, four, five or more different manufacturers, which may be competitors, to determine the "best" (most competitive) final price for the various construction elements that will be used in the set of construction plans. A need also currently exists in the architectural and/or construction industries for rapidly, efficiently and cost-effectively procuring information regarding whether or not a particular building, building material or building component is "green."

SUMMARY OF THE INVENTION

Very advantageously, the present invention provides methods and systems for rapidly, efficiently and cost-effectively generating, and modifying, a set of residential or commercial construction plan drawings for one or more construction elements, and a corresponding price quote schedule for such construction elements, in one general process, wherein a user can rapidly procure one, two, three, four, five or more comparative prices from one, two, three, four, five or more different manufacturers, which may be competitors, to determine the "best" (most p competitive) "real time" final price for the various construction elements that will be used in the set of construction plans. Also very advantageously, the present invention provides methods and systems for rapidly, efficiently and cost-effectively procuring information regarding whether or not a particular building, building material or building component is "green" (i.e., has third party energy certifications, such as "Energy Star" or "green" ratings). This latter aspect of the present invention is an improvement over the invention that is described in U.S. patent application Ser. No. 12/004,187, and very advantageously save architects and other plan drawers a significant amount of time and labor, and homeowners or other building owners a significant amount of energy (and the costs associated with the purchase of energy).

The difficulties and drawbacks that are associated with the above-described systems are advantageously overcome by the present invention, which is a method and system for an automated creation of a price schedule and/or a "green" schedule for a construction project. The present invention comprises steps and an implementation for providing a set of one or more construction plan drawings created with a software design tool and a palette of architectural 2D and/or 3D parametric symbols corresponding to respective construction elements. At least one parametric symbol corresponding to each construction element is inserted into the construction plan drawings. A cost value for each of the inserted parametric symbols is calculated corresponding to respective construction elements. A price schedule is automatically created including the total cost for all the inserted parametric symbols corresponding to respective construction elements, which can provide comparison pricing between two or more different manufacturers and/or distributors for the same construction element(s), for example, the pricing of a bay window for a kitchen having a variety of specified features (white in color, vinyl frame, Low E glass, Argon filled glass, a specified number of grids, corresponding grid patterns, etc.) from 1 stWindows, Andersen Windows and Pella Corporation. Alternatively, or additionally, a "green" schedule is automatically created including for all of the inserted parametric symbols corresponding to respective construction elements information that states whether or not the construction plan elements are "green."

In one aspect, the present invention provides an automated method for creating a price schedule for one or more construction plan elements of a construction project comprising:

(a) providing on a local computer an architectural software design tool and a construction plan drawing having at least one construction plan element, wherein the construction plan drawing is created with the architectural software design tool;

(b) providing on the local computer an add-on computer software code that runs as an internal component within the architectural software design tool, and that includes a palette containing one or more parametric symbols, and optionally one or more corresponding parametric symbol values, wherein the palette includes a parametric symbol for each of the construction plan elements;

(c) selecting one or more of the parametric symbols that is included in the palette for insertion into the construction plan drawing;

(d) optionally, selecting one or more parametric symbol values for one or more of the selected parametric symbols;

(e) optionally, selecting one or more types of manufacturers or distributors for one or more of the selected parametric symbols;

(f) inserting one or more of the selected parametric symbols into the construction plan drawing;

(g) using the add-on computer software code and an Internet connection, transmitting data corresponding to each of the inserted parametric symbols from the local computer to a remote server system;

(h) using a zip code, the add-on computer software code and an Internet connection, accessing price data from a web site present on the remote server system that includes price data for a purchase of construction plan elements corresponding to inserted parametric symbols from one or more available manufacturers or distributors in a geographical location within the zip code;

(i) determining from the price data a price for each of the construction plan elements corresponding to an inserted parametric symbol; and (j) using the add-on computer software code, creating a price schedule from the prices, wherein the price schedule includes a total cost for all of the construction plan elements corresponding to inserted parametric symbols, wherein the price schedule can include one or more construction plan elements, and wherein the price schedule may be immediately used on the local computer to place an order to purchase one or more construction plan elements that are present in the price schedule.

In another aspect, the present invention provides an automated method for creating a schedule for one or more construction plan elements of a construction project that states whether or not the construction plan elements are "green" comprising:

(a) providing on a local computer an architectural software design tool and a construction plan drawing having at least one construction plan element, wherein the construction plan drawing is created with the architectural software design tool;

(b) providing on the local computer an add-on computer software code that runs as an internal component within the architectural software design tool, and that includes a palette containing one or more parametric symbols, and optionally one or more corresponding parametric symbol values, wherein the palette includes a parametric symbol for each of the construction plan elements;

(c) selecting one or more of the parametric symbols that is included in the palette for insertion into the construction plan drawing;

(d) inserting one or more of the selected parametric symbols into the construction plan drawing;

(e) using the add-on computer software code and an Internet connection, transmitting data corresponding to each of the inserted parametric symbols from the local computer to a remote server system, either directly or via an optional communication module;

(f) using the add-on computer software code and an Internet connection, accessing data from a web site present on the remote server system that includes data for construction plan elements corresponding to inserted parametric symbols, wherein the data states whether or not the construction plan elements are "green"; and (g) using the add-on computer software code, creating a schedule from the data, wherein the schedule states for each construction plan element corresponding to an inserted parametric symbol whether or not the construction plan element is "green."

In yet another aspect, the present invention provides an automated system for creating a price schedule for one or more construction plan elements of a construction project comprising:

(a) a local computer;

(b) an architectural software design tool, wherein the architectural software design tool provides on the local computer a construction plan drawing having at least one construction plan element;

(c) a remote server system having a web site that maintains a database including pricing data for the construction plan elements, wherein an Internet connection exists between the remote server system and the local computer; and (d) an add-on computer software code that runs as an internal component within the architectural software design tool on the local computer;

wherein the add-on computer software code has a palette that includes at least one parametric symbol that corresponds with each of the construction plan elements, and that may be selected by a user for insertion into the construction plan drawing; and wherein the add-on computer software code:

(i) inserts at least one of the parametric symbols that are selected by a user into the construction plan drawing;

(ii) transmits via the Internet connection data corresponding to each inserted parametric symbol from the local computer to the remote server system;

(iii) receives via the Internet connection a price for the purchase of each of the construction plan elements corresponding to an inserted parametric symbol from the remote server system, wherein the price may be determined using a zip code and price data that is present on the web site on the remote server system, and corresponds with the purchase of the construction plan elements in a geographical location within the zip code; and (iv) generates a price schedule from the prices, wherein the price schedule includes a total cost for all of the construction plan elements corresponding to inserted parametric symbols, wherein the price schedule can include one or more construction plan elements, and wherein the price schedule can be immediately used on the local computer to place an order to purchase one or more construction plan elements that are present in the price schedule.

In still another aspect, the present invention provides an automated system for creating a schedule for one or more construction plan elements of a construction project that states whether or not the construction plan elements are "green" comprising:

(a) a local computer;

(b) an architectural software design tool, wherein the architectural software design tool provides on the local computer a construction plan drawing having at least one construction plan element;

(c) a remote server system having a web site that maintains a database including data for the construction plan elements, wherein the data states whether or not the construction plan elements are "green," and wherein an Internet connection exists between the remote server system and the local computer; and (d) an add-on computer software code that runs as an internal component within the architectural software design tool on the local computer;

wherein the add-on computer software code has a palette that includes at least one parametric symbol that corresponds with each of the construction plan elements, and that may be selected by a user for insertion into the construction plan drawing; and wherein the add-on computer software code:
  (i) inserts at least one of the parametric symbols that are selected by a user into the construction plan drawing;
  (ii) transmits via the Internet connection data corresponding to each inserted parametric symbol from the local computer to the remote server system, either directly or via an optional communication module;
  (iii) receives via the Internet connection from the remote server system for each of the construction plan elements corresponding to an inserted parametric symbol a statement or other indication as to whether or not the construction plan elements are "green," either directly or via an optional communication module; and
  (iv) generates a schedule from the statements, wherein the schedule includes a statement for each construction plan element corresponding to an inserted parametric symbol indicating whether or not the construction plan element is "green."

It is, of course, possible to combine the above methods and systems, so that one method or system produces for all construction plan elements corresponding to inserted parametric symbols both a price schedule and a schedule indicating whether or not the construction plan element is "green."

Thus, in another aspect, the present invention provides an automated method for creating for one or more construction plan elements of a construction project both a price schedule and a schedule that states whether or not the construction plan elements are "green" comprising:
  (a) providing on a local computer an architectural software design tool and a construction plan drawing having at least one construction plan element, wherein the construction plan drawing is created with the architectural software design tool;
  (b) providing on the local computer an add-on computer software code that runs as an internal component within the architectural software design tool, and that includes a palette containing one or more parametric symbols, and optionally one or more corresponding parametric symbol values, wherein the palette includes a parametric symbol for each of the construction plan elements;
  (c) selecting one or more of the parametric symbols that is included in the palette for insertion into the construction plan drawing;
  (d) optionally, selecting one or more parametric symbol values for one or more of the selected parametric symbols;
  (e) optionally, selecting one or more types of manufacturers or distributors for one or more of the selected parametric symbols;
  (f) inserting one or more of the selected parametric symbols into the construction plan drawing;
  (g) using the add-on computer software code and an Internet connection, transmitting data corresponding to each of the inserted parametric symbols from the local computer to a remote server system;
  (h) using a zip code, the add-on computer software code and an Internet connection, accessing price data from a web site present on the remote server system that includes price data for a purchase of construction plan elements corresponding to inserted parametric symbols from one or more available manufacturers or distributors in a geographical location within the zip code, and using the add-on computer software code and the Internet connection, accessing data from the web site that states whether or not the construction plan elements are "green";
  (i) determining from the price data a price for each of the construction plan elements corresponding to an inserted parametric symbol; and
  (j) using the add-on computer software code:
    (1) creating a price schedule from the prices, wherein the price schedule includes a total cost for all of the construction plan elements corresponding to inserted parametric symbols, wherein the price schedule can include one or more construction plan elements, and wherein the price schedule may be immediately used on the local computer to place an order to purchase one or more construction plan elements that are present in the price schedule; and
    (2) creating a schedule from the data that states whether or not the construction plan elements are "green," wherein the schedule states for each construction plan element corresponding to an inserted parametric symbol whether or not the construction plan element is "green."

In still another aspect, the present invention provides an automated system for creating for one or more construction plan elements of a construction project both a price schedule and a schedule that states whether or not the construction plan elements are "green" comprising:
  (a) a local computer;
  (b) an architectural software design tool, wherein the architectural software design tool provides on the local computer a construction plan drawing having at least one construction plan element;
  (c) a remote server system having a web site that maintains one or more databases for the construction plan elements including pricing data and data indicating whether or not the construction plan elements are "green," wherein an Internet connection exists between the remote server system and the local computer; and
  (d) an add-on computer software code that runs as an internal component within the architectural software design tool on the local computer;

wherein the add-on computer software code has a palette that includes at least one parametric symbol that corresponds with each of the construction plan elements, and that may be selected by a user for insertion into the construction plan drawing; and wherein the add-on computer software code:
  (i) inserts at least one of the parametric symbols that are selected by a user into the construction plan drawing;
  (ii) transmits via the Internet connection data corresponding to each inserted parametric symbol from the local computer to the remote server system;
  (iii) receives via the Internet connection from the remote server system for each of the construction plan elements corresponding to an inserted parametric symbol:
    (a) a price for the purchase of each of the construction plan elements, wherein the price may be determined using a zip code and price data that is present on the web site on the remote server system, and corresponds with the purchase of the construction plan elements in a geographical location within the zip code; and
    (b) a statement as to whether or not the construction plan elements are "green"; and (iv) generates:
(a) a price schedule from the prices, wherein the price schedule includes a total cost for all of the construction plan elements corresponding to inserted parametric symbols, wherein the price schedule can include one or more construction plan elements, and wherein the price schedule can be immediately used on the local computer to place an order to purchase one or more construction plan elements that are present in the price schedule; and
(b) a schedule of statements indicating whether or not each of the construction plan elements corresponding to inserted parametric symbols is "green."

The methods and systems of the present invention are each "revolutionary," and architects "love them." For example, the November 2006 issue of Cadalyst, an independent (non-biased) magazine containing numerous articles about CAD, includes an article (page 50, right column) that states, in part:

"1ST Pricing is the only product available that allows automatic product pricing and purchasing directly within AutoCAD, ArchiCAD and TurboCAD (FIG. 2). Its developer expects to soon introduce an Architectural desktop and Revit plug-in as well as Vectorworks integration. This patent-pending product automatically gives you five real-time quotes on doors and windows delivered to the job site based on zip code. Look forward to the ability to get realtime pricing updates for all components such as lumber packages." [Emphasis added.]

Currently, there is no plug-in (add-on) computer software or other mechanism, system or method that links the parameters of buildings, building materials, building components, appliances, objects or the like to a database that can automatically bring back an indication of the energy and/or water performance of the item (i.e., specify whether or not the item is "green").

As will be realized, the present invention is capable of other and different embodiments, and its several details are capable of modifications in various respects, all without departing from the scope and spirit of the invention. Accordingly, the description and accompanying figures are to be regarded as illustrative and not restrictive.

BRIEF DESCRIPTION OF THE DRAWINGS

FIG. 18 shows a registration page for registering a new user in accordance with the plug-in (add-on) computer software code of the present invention.

FIG. 19 shows "Scheduler Creation" controls in accordance with the plug-in (add-on) computer software code of the present invention that are used with the Parametric Symbol Palette of the present invention, which enable the creation, updating and viewing of a parametric symbol, a price schedule and/or a schedule of statements indicating whether or not construction plan elements corresponding to inserted parametric symbols are "green," and which allow the plug-in (add-on) computer software code of the present invention to connect to the 1stPricing or 1 stWindows online database in accordance with the present invention to obtain pricing information, or information regarding energy and/or water efficiency (i.e., whether "green" or not), for various construction elements.

FIG. 26 shows a highlighted portion of the exemplary price quote of FIG. 25, and options that are available for each price quote (view quote, alter quote, view all quotes, create new quotes, compare prices, prepare a quote and the like).

FIGS. 29-33 show various dialogs that are present in the 1stPricing or 1stWindows online database in connection with the check out process in accordance with the present invention after a price quote has been completed, and a user clicks a "Check Out" button.

FIG. 34 shows an export function of a generated price schedule in the 1stPricing or 1stWindows online database that permits the price schedule to be exported as a standalone object into a database in the form of various common computer applications or formats including, but not limited to, Excel, Word, Plain Text, HTML, XML and/or the like.

DETAILED DESCRIPTION OF THE PREFERRED EMBODIMENTS

The present invention may be understood more readily by reference to the following detailed description of the preferred embodiments.

DEFINITIONS

For purposes of clarity, various terms and phrases used throughout this specification and the appended claims are defined in the manner set forth below. If a term or phrase used in this specification, or in the appended claims, is not defined below, or otherwise in this specification, the term or phrase should be given its ordinary meaning.

The phrases "architectural CAD software," "architectural Computer Aided Design software" and "architectural software design tool" as used herein refer to specialized computer software (computer readable instructions and/or data, typically in the form of a code) that enable engineers and/or architects to design structures, such as rooms, houses, commercial buildings, construction elements (doors, windows, walls, floors, ceilings and the like), furniture and the like, on a computer, for example, TurboCAD V8 software (version 9), AutoCAD® software (versions 2002, 2004 and 2005), AutoCAD Architectural Desktop™ 2002 and 2004 and Autodesk Map® 5, 6 and 3D. Often, in addition to this specialized software, architectural CAD systems use a graphics monitor, a light pen or digitizing tablet for drawing, and a special printer or plotter for printing design specifications. Architectural CAD software is commercially available from sources that are known by those of ordinary skill in the art, for example, from CAD companies directly, or from CAD software dealers, such as Design Integrations Inc. (Marietta, Ga.).

The phrase "breather tube" as used herein means a small metal tube that is placed into an insulated unit's spacer to equalize pressure differences. Breather tubes can allow moisture to enter into the insulating unit, and are mostly used in high altitude locations.

The phrases "building products" and "construction elements" as used herein include, but are not limited to, windows, doors, acrylic glass or other blocks, fireplaces, sky lights, cabinets, fireplaces, Forced Air Units, drywall, lumber, insulation, molding, laminates, plumbing fixtures, electrical fixtures and the like.

Figure 2:
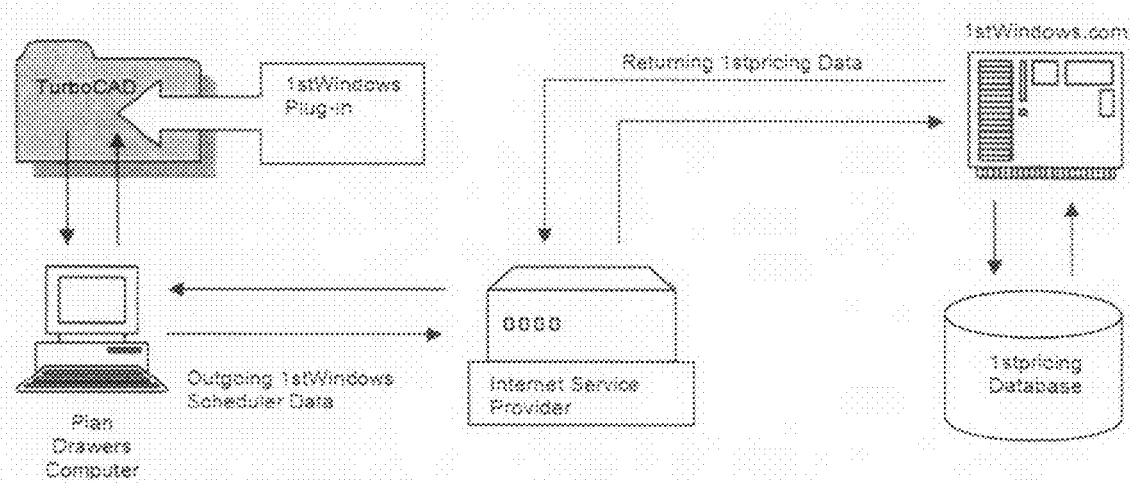
FIG. 2 is a flow chart that illustrates the basic data interaction between the plug-in (add-on) computer software code and a 1stPricing or 1 stWindows online database in accordance with the present invention.

The phrase "communication module" as used herein means a system for an optional use that is a part of the enhanced add-on (plug-in) computer software code that is described herein, and that may be employed to connect a plan drawer's (or other) computer to an Internet service provider for the purpose of permitting communication between the two. This module is a translation module. It takes the data from the plan drawer's computer and formats it into a standard format for the 1stPricing server and/or 1stWindows server. The module sends the formatted information to the server, subsequently receives back from the server formatted data, and then makes the formatted data available to the CAD program. CAD programs generally have copyrighted custom programming that is unique. The inventors have standardized a way to get pricing from the pricing server so that it is not necessary to have a separate server for each of the types of CAD program. In essence, there are CAD companies that speak all different languages. For example, CAD company 1 speaks language A, CAD company 2 speaks language B, and CAD company 3 speaks language C. If, for example, the 1stPricing server only speaks language Z, when CAD company 1 comes in speaking language A, it goes through the communication module and the communication module translates the data from CAD language A to CAD language Z, and then sends it to the 1stPricing server. The server interprets the data and sends back the information to the module with pricing, "green" data and/or other data (RFID tags, geospacial information, product specification information and the like). The module then translates the language from language Z back to language A, and then sends it to CAD company 1. From there, it is displayed to the CAD user. As used in the methods and systems of the present invention, the optional communication modules typically permit all CAD companies to enter as an additional method for communicating with the server on the 1stPricing or other web site. Alternatively, the CAD companies may achieve the same result using the method and system that are illustrated in FIG. 2. The communication module works automatically. All that a user has to do is hit the Create Schedule button or Update Schedule button described herein. From that point on, it works automatically.

The abbreviation "D" as used herein means "dimensional." For example, 2D refers to two dimensional, and 3D refers to three dimensional.

The term "green" as used herein means that a construction plan element, commercial or residential building, object, material, appliance (dishwasher, washing machine, toilet, sink, faucet or the like) or the like is environmental responsible, energy efficient and/or water efficient in that it is certified by the U.S. government or another third party (entity, organization and/or individual) as being: (i) energy efficient and/or water efficient, for example, by having a U.S. "Energy Star" label; and/or (ii) rated "green." Such certification or rating is preferably made by one or more accredited professionals that have demonstrated a thorough understanding of "green" building practices and principles using a green building rating and/or certification system that it accepted by those of ordinary skill in the art, such as the U.S. Leadership in Energy and Environmental Design (LEED), the U.S. Green Building Council (Washington, D.C.), Building Green, Inc. (Brattleboro, Vt.) or Green2Green (Charlottesville, Va.). Typically, a "green" construction plan element, commercial or residential building, object, material, appliance or the like reduces impacts on the environment and/or health through an increased energy and/or water efficiency in comparison with similar items (i.e., it is "energy efficient" and/or "water efficient"). Because the U.S. government provides tax credits, deductions and/or other benefits for constructing buildings that are "green," and using "green" materials, objects and appliances in the construction of buildings, it is very desirable for a builder or building owner to have a building certified as being "green." To determine how a building's energy use compares to other similar buildings in the country, the U.S. Environmental Protection Agency ("EPA") developed an energy performance rating system that rates a building's energy efficiency on a scale of 1-100. A building that scores 75 or above on this scale (placing its energy performance among the top 25 percent among similar buildings) can earn an "Energy Star" label. Receiving a rating for a building can easily be accomplished at the energystar web site using Portfolio Manager, a free, online tracking and benchmarking tool. To date, over 27,000 buildings have been rated, and more than 2,800 of them have earned an "Energy Star" label.

The phrase "green schedule" as used herein means a schedule that includes selected parametric symbols, and accompanying statements that correspond with the selected parametric symbols that indicate whether or not the construction elements that correspond with the selected parametric symbols are "green."

The phrase "immediately" as used herein typically means right away (i.e., within a period of less than about a few minutes) but, in some cases, may mean within the same day.

The phrase "1stPricing" as used herein refers to 1ST Pricing, which is currently physically located at 1858 East 20th Street, Signal Hill, Calif., 90755, and is a subsidiary of California Distribution Center, Inc. (a California corporation). 1stPricing has an online 1stPricing web site or other designated web sites.

The phrase "1stWindows" as used herein refers to 1 stWindows, which is currently physically located at 1858 East 20th Street, Signal Hill, Calif., 90755, and is a subsidiary of California Distribution Center, Inc. (a California corporation). 1stWindows has an online 1$^{st}$Windows web site or other designated web sites.

The abbreviation "ISP" as used herein means Internet Service Provider.

The phrase "parametric symbol" as used herein means an architectural 2D or 3D drawing that is typically of a common architectural, mechanical, construction or electronic element, such as a window, an entry or interior door, an acrylic glass block, a sky light or the like, and that includes parameters about its characteristics, such as size, color, type of material (wood, vinyl, aluminum, etc.), presence or absence of grids, number of grids, type of glass, coating on the glass, presence or absence of breather tubes, and the like. Parametric symbols typically enable an architect, other designer and/or architectural CAD software to work with an object as a real-world entity, rather than just as lines and polygons.

The term "parameter" as used herein means the desired or necessary characteristic(s) for a particular construction element, such as size (height, width and/or depth), type of material (vinyl, wood, aluminum or the like), color, type of glass, coating on glass, header height, presence or absence of grids, number of grids, presence or absence of breather tubes, presence or absence of Argon gas, and/or the like. For example, a window may have parameters of being 3'×6' in size (as opposed to a different size), made out of steel (as opposed to wood, aluminum or some other material), being vinyl clad (rather than not being vinyl clad), including low E glass (as opposed to some other type of glass) and having the color white (as opposed to some other color).

The phrase "parametric symbol schedule" as used herein means a schedule that includes selected parametric symbols, and selected characteristics that correspond with the selected parametric symbols. It may or may not include price information for the selected parametric symbols.

The phrase "price schedule" as used herein means a "parametric symbol schedule" that includes pricing data that corresponds with selected parametric symbols, and selected characteristics that correspond with the various parametric symbols selected.

The phrase "RFID" as used herein means Radio Frequency IDentification, which is a data collection technology that uses electronic tags for storing data. The tag, also known as an "electronic label," "transponder" or "code plate," is made up of an RFID chip attached to an antenna. Transmitting in the kilohertz, megahertz and gigahertz ranges, tags may be battery-powered or derive their power from the RF waves coming from the reader. Like bar codes, RFID tags identify items. However, unlike bar codes, which must be in close proximity and line of sight to a scanner for reading, RFID tags do not require line of sight, and can be embedded within packages. Depending upon the type of tag and application, they can be read at a varying range of distances. In addition, RFID-tagged cartons rolling on a conveyer belt can be read many times faster than bar-coded boxes.

The term "statement" as used herein means one or more words, symbols, numbers or the like, with or without punctuation (periods, commas, question marks, explanation points or the like), or any combination thereof. For example, the statement may simply be the letter "G" (representing that a particular parametric symbol, and corresponding plan construction element, is "green"). As another example, the statement may be the two letters "NG" (representing that a particular parametric symbol, and corresponding plan construction element, is not "green"). Further, the absence of a statement for a particular parametric symbol, and corresponding plan construction element, may be used to represent that the particular parametric symbol, and corresponding plan construction element, is not "green."

The phrase "Static Product Cart Technology" as used herein means a "standard" (traditional) "off the shelf" type of shopping cart technology that can be purchased commercially, and that does not have any intelligence. It is typically used by a wide variety of known and unknown product manufacturers, such as Circuit City and Best Buy, for selling standard products. "Static Cart Product" technology does not use zip codes, a software design tool or a plug-in (add-on) computer software code, and does not have parametric symbols inserted into a construction plan. Further, it cannot create a price schedule from price quotes.

The phrase "symbol palette" or "palette" as used herein means a dialog box that has all of the options that a user can choose for a particular object or construction element. (See FIGS. 10-13.)

The phrases "third party certification" and "certified by a third party" as used herein in connection with "green" buildings, construction plan elements, object, building materials and appliances means the certification of a specific product or process as being "green" that is performed by an organization independent from those who produce the product or process. Certification is often used to substantiate the environmental attributes of specific products (such as the percentage of recycled content) or processes (such as a sustainable harvesting operation for forests).

General Description

The present invention is directed to an automated pricing and/or "green" indicating system in which a price schedule and/or a "green" schedule for a construction product, such as a window, is generated and inserted directly into a set of construction project plans. For example, in a preferred embodiment, the construction product can be a construction material, such as a window, an acrylic glass block, a door, a skylight and/or the like, and is inset into the construction plans. Of course, it is to be understood that any number of product types can be employed, and any other different symbols can be employed in a different embodiment other than construction materials, without departing from the present invention. The description that follows, with particular applicability to construction materials, should be regarded as exemplary and not limiting.

The present invention is preferably implemented using a plug-in (or add-on) computer software code component that has an ability to work within an architectural CAD (Computer Aided Design) software product and with an online 1stPricing, 1stWindows dot com or similar database. While most of the discussion that is set forth herein refers to the 1stPricing dot com online web site or database, the 1stWindows dot com online web site or database, or a similar web site or database, may also be employed. Each construction element selected by a user, such as a window, an acrylic glass block, a door and/or a skylight, is inset into the building plans via one or more selected parametric symbols that are present in the plug-in (add-on) computer software code. Each parametric symbol adds a combined two-dimensional and/or three-dimensional representation of the associated (corresponding) construction product to the construction plans.

Very advantageously, a cost value (final price) can be calculated by an online 1stPricing or similar database for each selected construction element (parametric symbol), which may optionally advantageously include a price comparison for each selected construction product between different available manufacturers within a selected zip code, in order that a user may procure "the" best or most competitive price for each selected construction product, and a total (final) cost can then advantageously automatically and virtually instantaneously be calculated by the same database (typically within from about 5 to about 15 seconds) for an entire set of construction elements (all of the selected parametric symbols). Advantageously, a price schedule that includes the foregoing costs can then automatically and virtually instantaneously be created (typically within about 1 to about 13 seconds) by the online 1stPricing database, and then the price schedule advantageously can be inset directly into the building plans by the plug-in (add-on) computer software code, so that the building plans themselves advantageously include each selected parametric symbol, as well as a final price schedule for all such parametric symbols. The price schedule advantageously contains a detailed list of the selected construction products with attached corresponding pricing to provide a total cost value therefore. The price schedule can also be exported as a standalone object in the form of various common computer applications or formats including, but not limited to, Excel, Word, Plain Text, HTML, XML and the like. Pricing is determined via an Internet or other connection between the architectural plan drawer's local computer system and a database maintained on a remote system, such as the online 1stPricing dot com database. Product data (product characteristics and features) passes from the architectural plan drawer's local computer to the database, and pricing data (and, optionally, information as to whether or not selected construction plan elements are "green") then passes back to the architectural plan drawer's local computer and becomes embedded within the construction plans. The system may be implemented over the Internet, a LAN, a physical storage medium, a CD, a DVD and/or the like.

Also very advantageously, a statement of whether or not a particular construction plan element (corresponding to a specified parametric symbol) is "green" or not can be automatically provided by the online 1stPricing dot com or similar database for each selected construction element (parametric symbol). Advantageously, a "green" schedule that includes such statements can then automatically and virtually instantaneously be created (typically within about 1 to about 13 seconds) by the online 1stPricing database, and then the "green" schedule advantageously can be inset directly into the building plans by the plug-in (add-on) computer software code, so that the building plans themselves advantageously include each selected parametric symbol, as well as a final "green" schedule for all such parametric symbols. The "green" schedule advantageously contains a detailed list of the selected construction products with attached corresponding statements as to whether or not the selected construction products are "green." The "green" schedule can also be exported as a standalone object in the form of various common computer applications or formats including, but not limited to, Excel, Word, Plain Text, HTML, XML and the like. Whether or not a selected construction plan element is "green" is determined via an Internet or other connection between the architectural plan drawer's local computer system and a database maintained on a remote system, such as the online 1stPricing dot com database. Product data (product characteristics and features) passes from the architectural plan drawer's local computer to the database, and information regarding whether or not selected construction plan elements are "green" (and, optionally, pricing data) then passes back to the architectural plan drawer's local computer and becomes embedded within the construction plans. The system may be implemented over the Internet, a LAN, a physical storage medium, a CD, a DVD and/or the like.

The basic steps of a practical implementation of the present invention are laid out herewith. Detailed explanations and step-by-step processes are set forth in detail in associated sections hereinbelow.

Energy Certifications and Ratings

For the reasons that are set forth below, it is very advantageous for "green" statements and a "green" schedule to be rapidly and efficiently provided or produced in connection with parametric symbols that are inserted into a construction plan, and their associated construction plan elements. "Green" construction plan elements, materials, appliances and buildings typically very desirably:

promote good indoor air quality (typically through reduced emissions of volatile organic compounds (VOCs) and/or formaldehyde);

are durable, and have low maintenance requirements;

incorporate recycled content (post-consumer and/or post-industrial);

have been salvaged from existing or demolished buildings for reuse;

are made using natural and/or renewable resources;

have low "embodied energy" (the energy required to produce and transport materials);

do not contain chlorofluorocarbons (CFCs), hydrochlorofluorocarbons (HCFCs) or other ozone depleting substances;

do not contain highly toxic compounds, and their production does not result in highly toxic by-products;

are obtained from local resources and manufacturers;

for wood or bio-based products, employ "Sustainable Harvesting" practices;

can be easily reused (either whole or through disassembly);

can be readily recycled (preferably in a closed-loop recycling system); and/or are biodegradable.

The characteristics of "green" products can vary depending on the material type. The "green" attributes of a concrete mix, for instance, might include the use of fly-ash (a post-industrial recycled content material), while the "green" attributes of an interior paint might focus on low volatile organic compound (VOC) content. Because of this high degree of variability, the evaluation of "green" products generally requires a working knowledge of:

relevant health and environmental impact issues associated with different material types;

government, industry, and third-party standards for "green" products, where they exist; and available "green" products in the marketplace, including their specific "green" attributes, performance characteristics, appearance, and costs.

Installation of Architectural CAD Software on Local Computer

An initial step of the methods and systems of the present invention is to install architectural CAD (Computer Aided Design) software (or another architectural software design tool) on an architect or plan drawer's local computer system. The plug-in (add-on) computer software code of the present invention, in the form of installation files, is also preferably installed on the same local computer system during the basic installation of the architectural CAD software. Alternatively, the plug-in (add-on) computer software code of the present invention may be installed after an installation of the architectural CAD software, and could be acquired either from a physical storage medium containing the add-on code (e.g., a compact disc), or by its download from a remote server system, such as from the 1stPricing dot com web site or another designated web site. (See the section set forth hereinbelow regarding "Installation.")

After the software installation, the architectural CAD software program (or another architectural software design tool) is then started in a manner known by those of skill in the art. An existing architectural CAD drawing, for example, for a room in a house or in a commercial building, is then opened, or a new set of architectural or design plans is created using an architectural CAD "Wall" (or similar) tool in a manner known by those of skill in the art. (See the section set forth hereinbelow regarding "Interacting with the Wall Tool.") The Symbol Palette of the desired object (dragged and dropped from the symbol library—See FIG. 3) is then activated in a manner known by those of skill in the art. (See the section set forth hereinbelow regarding "Activation.")

In an embodiment of the invention in which a database containing pricing information and/or a database containing information regarding whether or not construction plan elements are "green" is maintained on a remote server system, such as an Internet web site, for example, the online 1stPricing web site, a connection is activated by the CAD user, who has the plug-in (add-on) computer software installed within his architectural (or other) CAD program, e.g. an Internet connection. For a first-time user (generally an architect or builder) accessing the remote server system database(s), a ZIP code may be entered to obtain pricing information for construction products in connection with the construction project, which may be obtained in connection with one, two, three, four, five or more different manufacturers and/or distributors within the zip code (to procure "the" best price for each construction product). The price of selected construction products (windows, doors, acrylic glass blocks, sky lights and/or the like) can, of course, vary widely with the geographical location of the construction project. Alternatively, such a price schedule and/or a "green" schedule can be generated without the use of a ZIP code. A parametric symbol (window, door, acrylic glass block, sky light and/or the like) is clicked, and a symbol palette dialog box opens up with the various options/attributes to select. Data for the product options are entered via drop down boxes, check boxes or radio buttons, or via direct data entry, and then clicking "OK." By clicking "OK," the user selects the options/attributes for the parametric symbol and inserts the resulting object into the construction plan. (A parametric symbol becomes an object once the user attaches attributes to it and inserts it into the construction plan.) Entry is then made of specific parameters that make up the parametric symbol, such as color, type of material, size, presence or absence of grids and the like. The parametric symbol is then inserted into the construction or design plans, for example, into a wall of a kitchen of a house. From there, the parameters of the parametric symbols can be modified, as is necessary or desired. (See the section set forth hereinbelow regarding "Symbol Properties.") The latter two steps can be repeated to establish the desired placement of the construction elements for the construction project into the construction plan drawings. Afterwards, a price schedule and/or a "green" schedule is created. (See the section set forth hereinbelow regarding "Scheduler Creation Controls.")

Each of the parametric symbols can be revised, added, deleted, modified and/or edited in any manner that is desired, or as the construction project requires. The price schedule and/or "green" schedule can then be updated one or more times, and then transmitted (exported) over an Internet connection, a LAN (local area network), an external storage device or the like into a database. Revised pricing and/or "green" information can then be sent back to the architectural CAD drawing, which reflects new changes that have been made, and provides a price schedule and/or "green" schedule "Reference Number." This price schedule and/or "green" schedule "Reference Number" can be entered into a database to retrieve pricing information and/or information regarding whether or not selected construction plan elements are "green," upon which the building products (doors, windows, and/or the like) listed in the price schedule and/or "green" schedule can advantageously then be immediately purchased, or purchased on a subsequent date. (See the section set forth hereinbelow regarding "Online Operations.") Each time an object is changed after the initial drawing has been priced and/or analyzed for "green" information, the plug-in (add-on) computer software reminds the plan drawer that plan pricing and/or "green" information should be updated. Also, the plug-in (add-on) computer software pings the pricing database and/or "green" database periodically to see if any pricing or "green" information has changed, or if there is a new version of the plug in (add-on) computer software, and then asks the plan drawer to make appropriate updates.

The methods and systems of the present invention are improvement to the methods and systems that are described in U.S. patent application Ser. No. 12/004,187 in that they have the added novel feature of being capable of automatically determining whether or not the parametric symbols (and corresponding construction plan elements) are "green," which is extremely advantageous to architects and other plan drawers. Such determination may be made with or without corresponding pricing information, depending upon the needs or desires of the plan drawer. There has been a long-felt and unmet need for this feature in the architectural industry, which very advantageously saves plan drawers a significant amount of time and labor. Without this feature, the plan drawers have to manually look up information with respect to each separate construction plan element regarding whether or not such construction plan element is "green," which is very labor intensive and time consuming. Currently, there is no other existing rapid or automated method for procuring this "green" information. These improvements have been achieved with an enhancement of the plug-in (add-on) computer software code and databases that are described in U.S. patent application Ser. No. 12/004,187, which now additionally include information regarding whether or not the parametric symbols (and corresponding construction plan elements) are "green." It is to be noted that the inventors are not themselves rating parametric symbols (and corresponding construction plan elements) as being "green" or not, but rather are including in their database on the 1 stPricing or other web site information in connection with "green" certifications that have been made by third parties, for example, the U.S. government ("Energy star" labels), LEED, building product or material manufacturers or other third parties.

Figure 1:
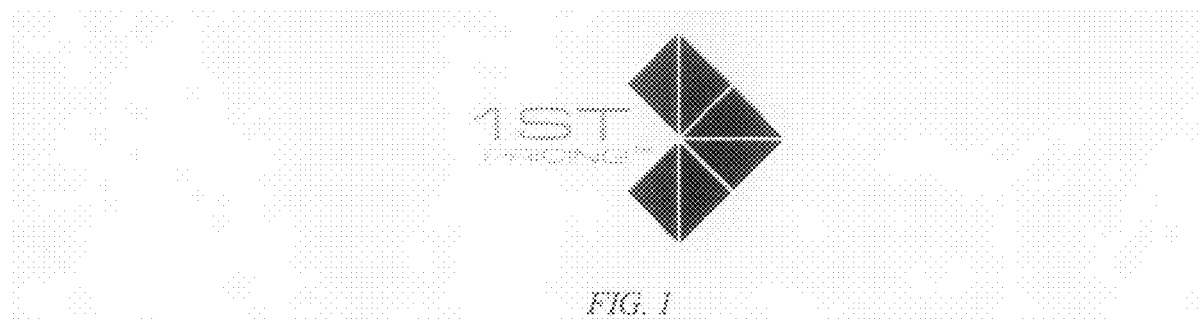
FIG. 1 is a depiction of an activation button that is present in a software toolbar of the plug-in (add-on) computer software code in accordance with the present invention

Installation of Plug-In Computer Software on Local Computer System—FIG. 1

Installation of the plug-in (add-on) computer software code component described herein (permitting accessing of pricing and/or "green" information in connection with parametric symbols), which a user may obtain from a CD ROM or download from the 1 stPricing or other website, on the same local computer system may be accomplished via a set of installation files in a manner known by those of skill in the art. These installation files may be part of the architectural CAD software installation program, or may be accessed from a CD, LAN, WAN, Intranet, Internet or any other such medium. The installation procedure typically requires the running of a Setup.exe (executable file), preferably using standard Windows™ OS methodology, although the invention can also be implemented using Mac, Linux or any other such type of operating system. It is contemplated to include an opening advertisement popup to the architectural CAD software, promoting the present invention. This popup could appear each time that the architectural CAD software is started. Selecting a checkbox that would be imbedded within the popup would deactivate it.

The plug-in (add-on) computer software code is a set of computer code that is designed to run within a parent computer software application or code, particularly architectural CAD software (or another architectural software design tool), as an internal component, i.e., it "adds on" to the parent software application. Installation of the plug-in (add-on) computer software code has an effect of placing "parametric symbols" files, and associated data files, onto a computer in which the plug-in (add-on) computer software code is installed. The parametric symbols in the parametric symbols files depict popular configurations of common products, preferably construction elements, such as different types of windows, doors, acrylic glass blocks, sky lights, cabinets, fireplaces, Forced Air Units, drywall, lumber, insulation, molding, laminates, plumbing fixtures, electrical fixtures, and the like. In a preferred embodiment, three types of parametric symbols are provided: (1) Windows; (2) Doors; and (3) Acrylic Glass Blocks. The installation of the plug-in (add-on) computer software code also typically adds the following controls to the architectural CAD software: (1) an "activation" button, which is added to the main architectural CAD software toolbar, as is shown in FIG. 1; (2) a menu item labeled "1 stPricing," which is added in the architectural CAD software "View" menu; and (3) a "1stPricing" parametric symbol palette, which is added to the architectural CAD software palettes.

Figure 35:
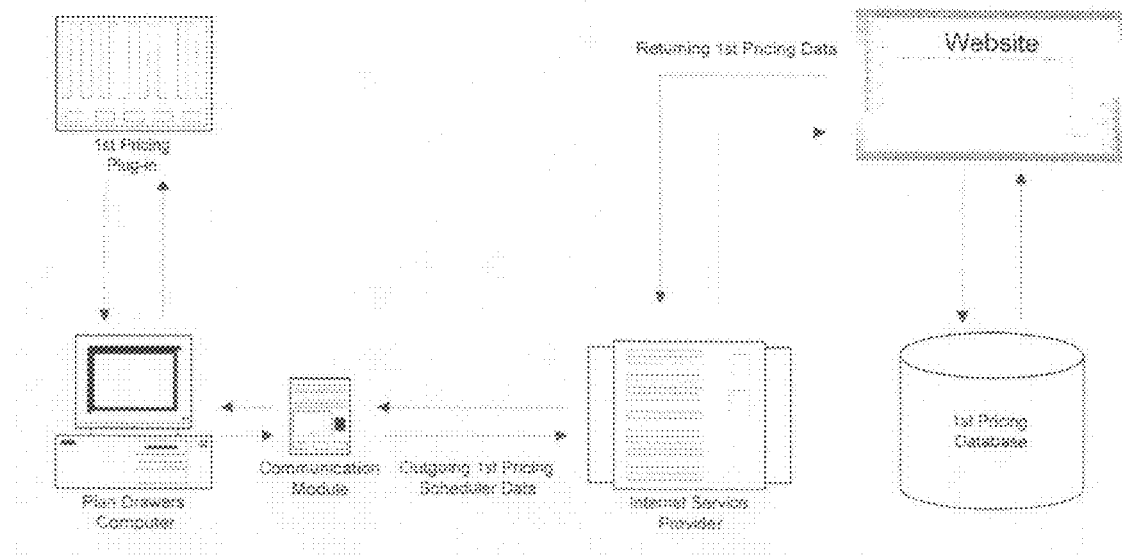
FIG. 35 is a flow chart that illustrates the basic data interaction between the plug-in (add-on) computer software code and a 1stPricing or 1stWindows online database in accordance with the present invention. In contrast with the flow chart that is shown in FIG. 2, the flow chart of FIG. 35 additionally includes a communication module, which results in an enhanced communication path.
Figure 36:
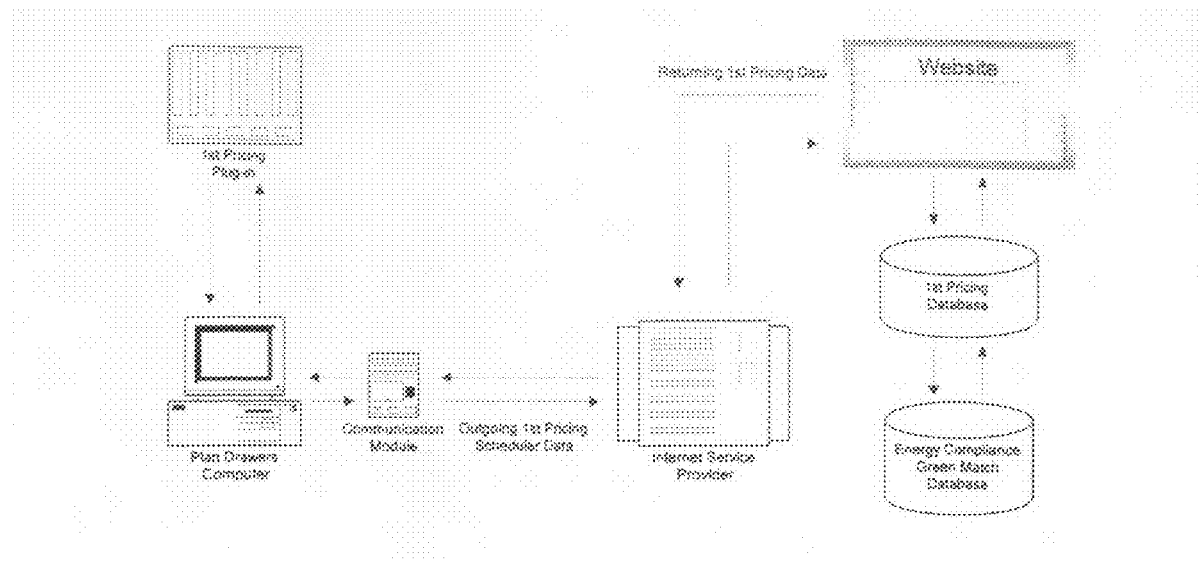
FIG. 36 shows the same flow chart as FIG. 35, with the exception that it additionally includes a database containing "green" data.

Data Flow—FIGS. 2, 35 and 36

FIGS. 2, 35 and 36 show three different basic data interactions that may occur between the plug-in (add-on) computer software code described hereinabove and the corresponding online or other database of pricing data and/or information (RFID tags, geospacial information, product specification information and the like.) In contrast with FIG. 2, the flow charts that are shown in FIGS. 35 and 36 additionally include an optional communication module. In contrast with FIG. 35, the flow chart that is shown in FIG. 36 additionally includes a data base containing "green" data and/or information. The plug-in (add-on) computer software code operates within the architectural CAD software, and sends outgoing data and/or information regarding all of the parametric symbols that have been selected by the user (construction products), and that have been imbedded within the construction plans, and their parameters, preferably first to an optional communication module (FIGS. 35 and 36), and then to a to a remote server system (FIGS. 2, 35 and 36). However, as is shown in FIG. 2, the outgoing data and/or information may be sent directly to a remote server system (i.e., without using a communication module). The outgoing data is preferably sent from the user's local computer over the Internet via the user's ISP to a web site on a remote server system, for example, the online 1stPricing web site (FIGS. 2, 35 and 36). The remote server system implements a pricing database and/or a "green" database (FIG. 36) in accordance with the present invention, and with the plug-in (add-on) computer software code. The plug-in (add-on) computer software code makes the parametric symbols/objects "smart" by assigning code to the parametric symbols/objects once they are inserted into the construction plan. When pricing or "green" information is generated, this plug-in (add-on) computer software counts the objects along with their assigned code, and then goes out of the program preferably first to the communication module (FIGS. 35 and 36), and then to the external database and provides a zip code. However, as is shown in FIG. 2, this information may go directly to the external database (i.e., without using an optional communication module). Then, this plug-in (add-on) computer software code gives the list of objects and their attributes to the server, and asks for a match. After that, the plug-in (add-on) computer software sends the matches and the pricing and/or "green" information back to the communication module (FIGS. 35 and 36), and then to the CAD user's computer. However, as is shown in FIG. 2, this information may go directly to the CAD user's computer (i.e., without using a communication module). (The remote server is one or more databases containing pricing and/or "green" information and "talks" to CAD drawing objects preferably via a communication module when they come in. The plug-in (add-on) computer software code is a communication link from CAD to the database server and back to CAD.)

Computer software that is present on the remote server system, such as on the online 1stPricing web site, compares the information and/or data that it receives from the user with a pricing database and or database containing "green" information ("green" certifications made by third parties) that is present at the remote server system to determine appropriate prices and "green" statements for the various construction or other products, and for the particular characteristics (parameters) thereof, that are represented by the parametric symbols. The computer software then returns the pricing information, "green" information and/or data, preferably over the Internet, preferably to the communication module, and then to the user's local computer system (FIG. 2). The plug-in (add-on) computer software code receives the pricing data and/or "green" information provided from the remote server system, generates a price schedule and/or a "green" schedule for the construction or other elements, and imbeds the price schedule and/or "green" schedule with the pricing and "green" statements directly into an architectural CAD drawing, such as into a window that is present in a kitchen of a house.

Figure 3:
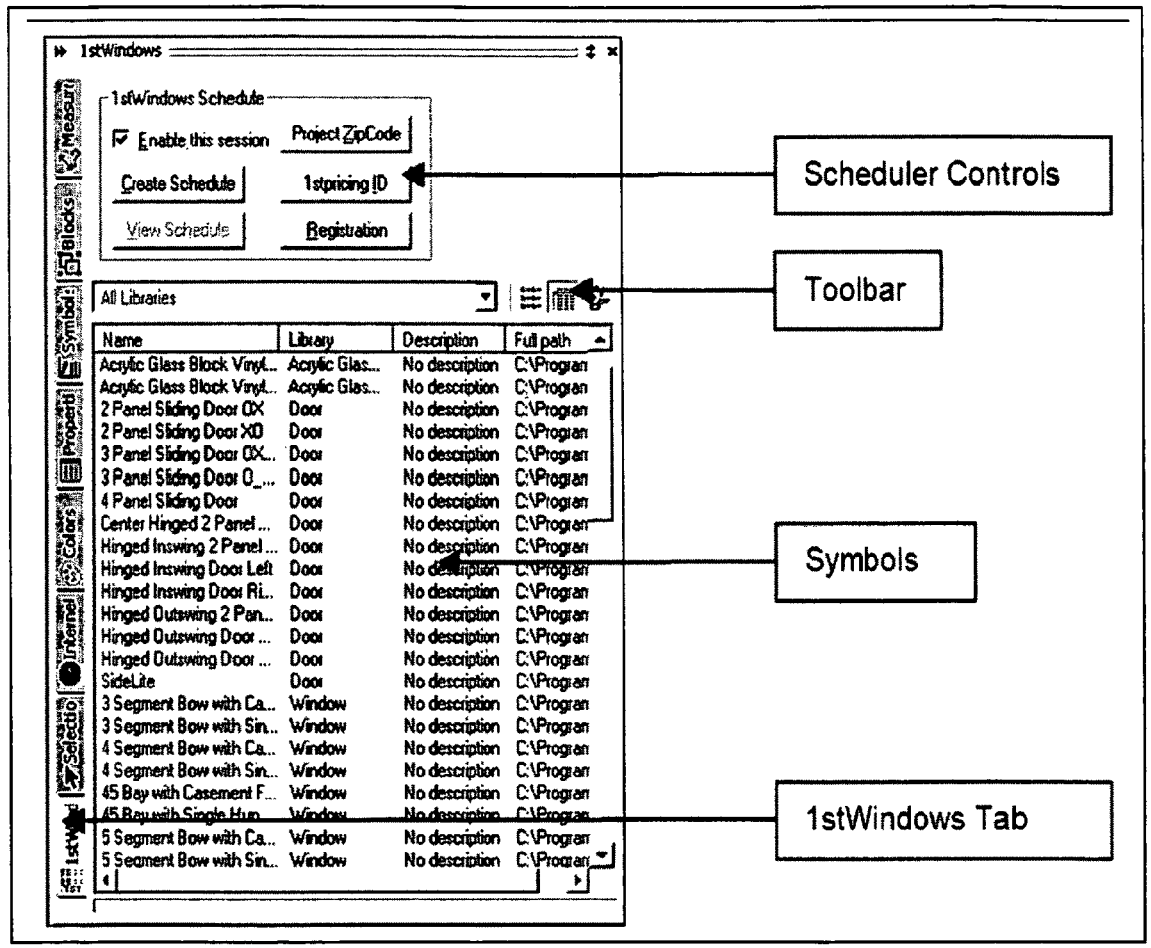
FIG. 3 illustrates a Parametric Symbol Palette that is present in the plug-in (add-on) computer software code that is used with the present invention.

Symbols Palette—FIG. 3.

As shown in FIG. 3, a Symbols Palette, which becomes present on the user's local computer as a result of the plug-in (add-on) computer software code, includes a set of controls and a list of one or more architectural parametric symbols. The controls are divided into two groups: (1) a toolbar; and (2) scheduler controls. In the disclosed embodiment, the parametric symbols are preferably organized into three groups or libraries: (1) windows; (2) doors; and (3) acrylic glass blocks.

Activation

The Symbols Palette cannot be used until it is activated. Clicking the activation button or menu item that is present therein will launch (activate) the Symbols Palette. After installation of the plug-in (add-on) computer software, the Symbols Palette can be launched by default. To activate the Symbols Palette, an architect or other user may: (1) click the "1stPricing activation" button; (2) select "View/1stPricing" from the menu; or (3) click the "1stPricing" tab in the architectural CAD software palette.

Figure 4:
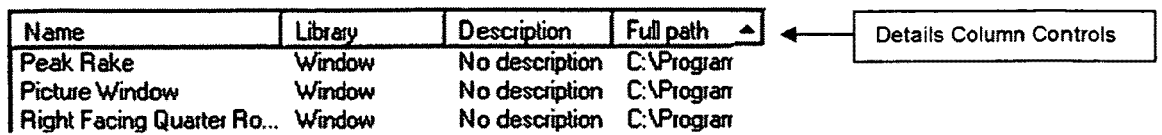
FIG. 4 shows parametric symbol details of the Parametric Symbol Palette illustrated in FIG. 3.
Figure 5:
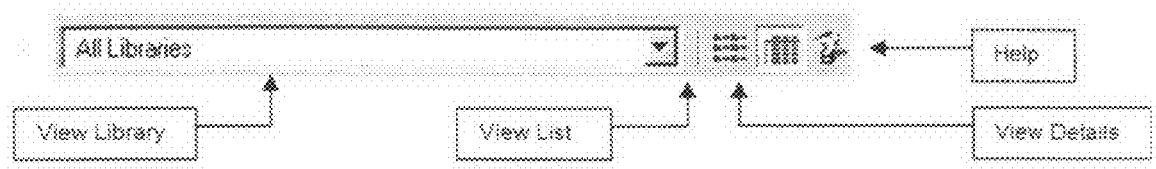
FIG. 5 shows the toolbar of the Parametric Symbol Palette that is illustrated in FIG. 3.

Toolbar—FIGS. 4 and 5

In a preferred embodiment of the invention, as is shown in FIG. 5, the toolbar comprises four controls, which include one drop down menu, and three buttons, and are as follows:

(1) A "View Library" drop down menu allows the user to arrange a list of available parametric symbols to display a specific type of parametric symbol, such as windows, doors, skylights, acrylic glass blocks, and/or the like, or to view all of the parametric symbols by selecting the "All 1$^{st}$Pricing Symbols" option.

(2) A "View List" button allows the user to set the parametric symbols list, so that only the names of the parametric symbols appear, such as Bay with Casement Flankers, or 2 Panel Sliding Door XO.

(3) A "View Details" button allows the user to set the parametric symbols list, so that each parametric symbol is listed with four details (FIG. 4): (1) Name; (2) Library; (3) Description; and (4) Full Path. The parametric symbols are listed vertically, with the detail organized in four columns horizontally. When this option is selected, an additional control button is appended to the top of each of the detail columns. Clicking on any of these additional buttons reorders the symbols list alphabetically by the detail that the associated column contains.

(4) A "View Help" button allows the user to open a "1 stPricing" help system, which permits the user to get help.

Parametric Symbols—FIGS. 6, 7, 8 and 9

A set of one or more architectural parametric symbols are preferably provided by the plug-in (add-on) computer software code to represent a majority (or more) of possible options that are generally available to a user of the system of the present invention. Each parametric symbol typically has unique aspects and attributes (parametric symbol values) which, optionally, may be selected by a user prior to inserting a parametric symbol into a construction plan drawing, such as width, height, color, depth, thickness of glass and/or texture, and is a combination of two architectural CAD objects: (1) a two-dimensional representation of a construction element; and (2) a three dimensional representation of a construction element (as is shown, respectively, in FIGS. 8 and 9). However, the user does not need to select any parametric symbol values for any parametric symbols, which values are optional, because each parametric symbol will typically have pre-set parametric symbol values, which will be used unless the user selects different parametric symbol values, as is discussed below. The parametric symbols are designed to interact with an architectural CAD software "Wall Tool" (or similar tool).

After a user optionally selects one or more parametric values for one or more parametric symbols, the parametric symbols are inserted into the construction plan drawings by clicking on one or more of the parametric symbols that are present in the list of parametric symbols that is present in the Symbols Palette, and then moving (dragging) them into the architectural drawing, such as a room of a house. A parametric symbol advantageously will automatically align itself with the orientation of a wall of a structure, such as a house, if applicable, or with any other applicable location, thereby showing the user a preview of the parametric symbol prior to placing the parametric symbol within the architectural drawing.

Before a parametric symbol is moved into the construction plans, preferably a "1stPricing Symbol Properties" palette (or similar) dialog automatically appears. This "1stPricing Symbol Properties" palette dialog allows "parametric symbol values," such as color, construction material, size, presence or absence of grids, layout of grids, number of grids, type of glass, and the like, for example, in the case of a window, 42"×36", Standard Pattern Flat Grids and 5 Segment Bow, or in the case lumber, 2"×4"×10' lumber, to be optionally specified for each parametric symbol that is present in the Symbols Palette. Entry is made of specific parameters that make up the parametric symbol (parametric symbol values) by clicking on various available drop down menus, and then selecting specific available parameters, as is described herein.

Figure 6:
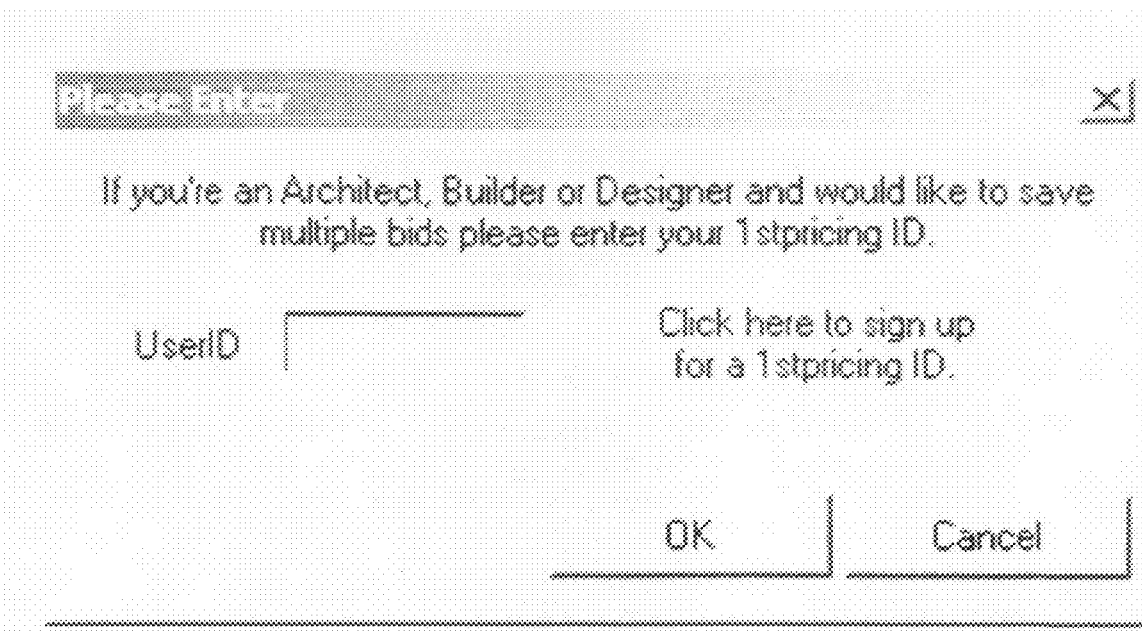
FIG. 6 shows a User ID dialog that appears in the plug-in (add-on) computer software code when a first parametric symbol is inserted into a set of construction plans (by clicking on the parametric symbol in the Parametric Symbol Palette).

Parametric symbol values can include any size or material specification for a given item, such as a construction product (window, door, acrylic glass block sky light, and the like), including a standard product item number for a respective construction element. In a new drawing, as is shown in FIG. 6, a User ID dialog preferably automatically appears when the first parametric symbol is inserted into the construction plans if a User ID has not yet been entered by the user. Further, and very advantageously, the "1stPricing Symbol Properties" palette dialog may be recalled to edit one or more parametric values for any parametric symbol that has already been inserted into the construction plans. Selecting a parametric symbol and clicking the right button on a computer mouse will generally open a local menu. Selecting the "1stPricing Symbol Properties" palette option from the local menu will generally open the "1stPricing Symbol Properties" dialog for the parametric symbol.

Figure 7:
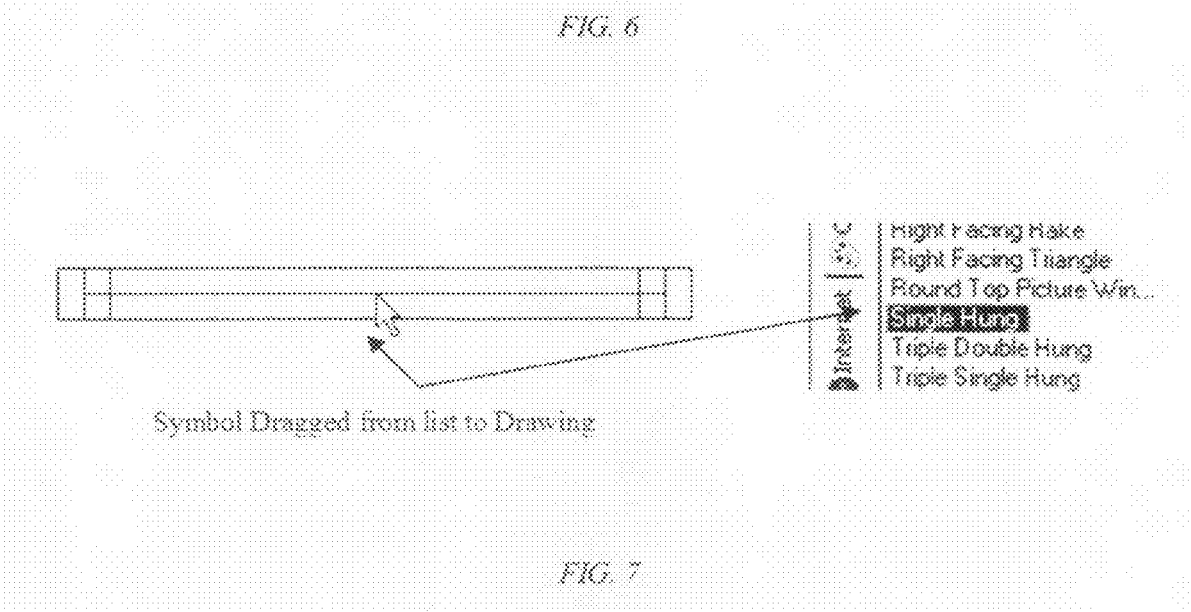
FIG. 7 illustrates an operation for inserting parametric symbols into a set of construction plans in accordance with the plug-in (add-on) computer software code of the present invention.
Figure 8:
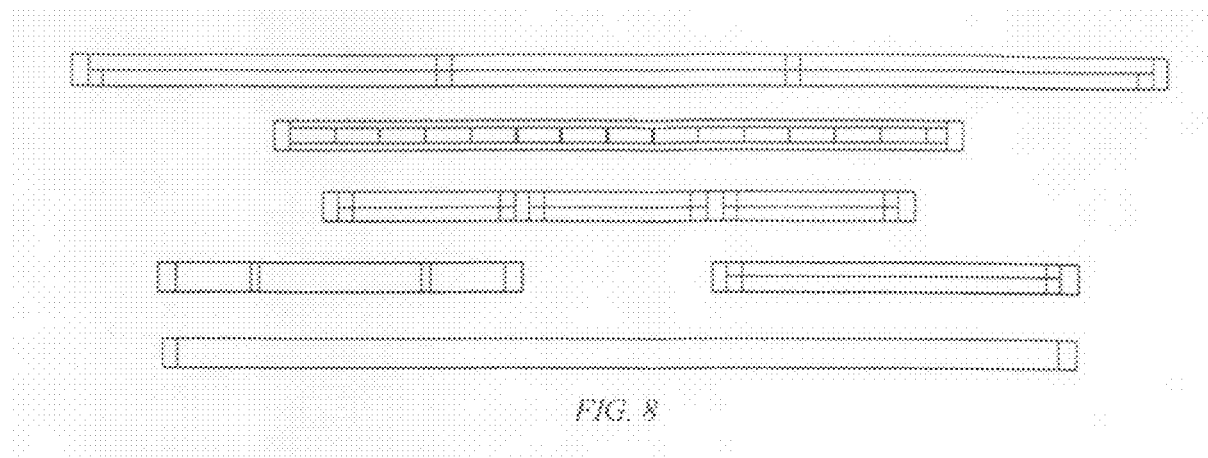
FIGS. 8 and 9, respectively, show two and three dimensional representations of the parametric symbols that may be employed in accordance with the plug-in (add-on) computer software code of the present invention.
Figure 9:
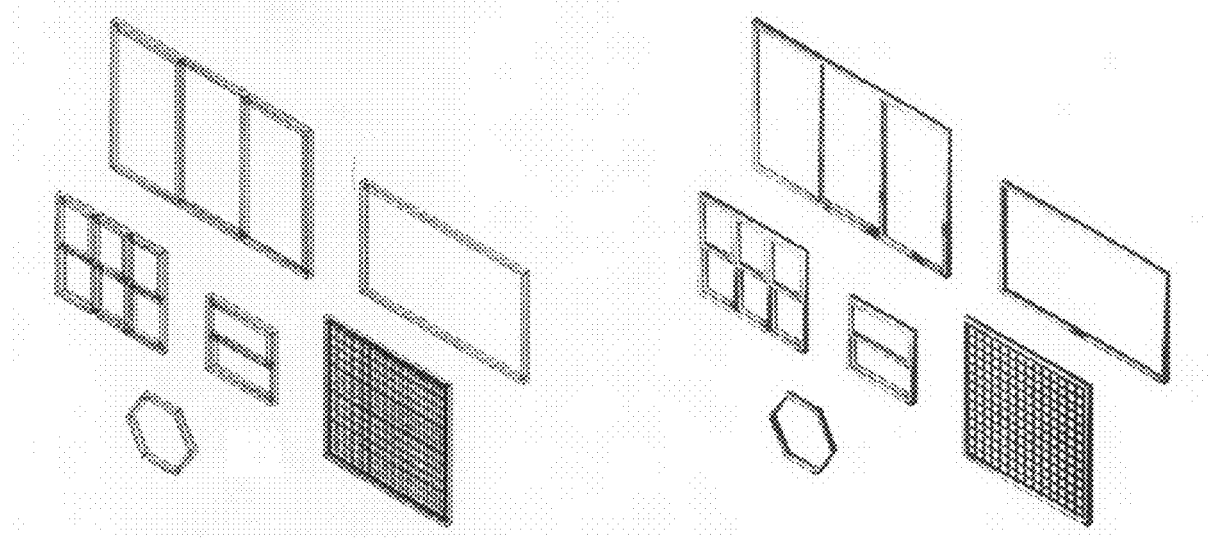

Operation can be employed, for example, in the manner that is shown in FIG. 7. A user may click on the parametric symbol to be inserted into the construction plans, and move (drag) the parametric symbol to a particular location in the construction plans where it is to be inserted, such as a particular wall in a kitchen of a house, and then release the button. The user may modify the parametric properties using the "1stPricing Symbol Properties" palette dialog, as is desired or necessary. When the parametric symbol is placed into the construction plans, and modified as desired or required, the user may click "OK," which causes the object to change to reflect the new parameters entered into to the palette.

Symbol Properties

Each type of parametric symbol corresponding to a product item, such as a construction element (windows, doors, acrylic glass blocks, sky lights and the like) has a unique set of parametric attributes (properties) that may be specified for each parametric symbol. In addition, each specific parametric symbol has a unique range of values that is permissible for those parametric attributes. Typically, parametric symbol properties may only be edited by using the "Properties Dialog." To edit the parametric symbol properties, a user should select the parametric symbol to be modified, and then click the right mouse button. The user should then select "1 stPricing Properties" from the local menu and modify the parametric symbol properties in the Properties Dialog as is necessary or desired. When the parametric symbol properties are modified as required or desired, the user should then click "OK."

Figure 10:
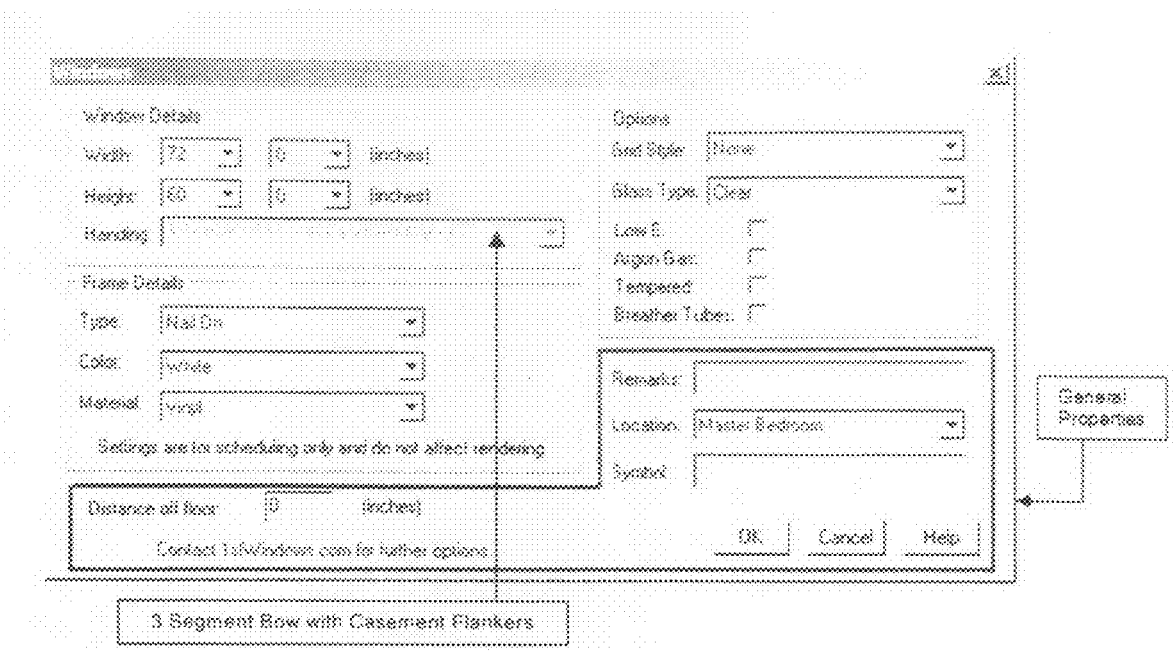
FIG. 10 shows a portion of a dialog for specifying general properties for one or more parametric symbols (location, remarks, distance off of floor, and the like) in accordance with the plug-in (add-on) computer software code of the present invention.

General Properties for Parametric Symbols—FIG. 10

As is shown in FIG. 10, "General Properties" are available for all parametric symbol types. The "Parametric Controls" that are available as General Properties are indicated as follows. The "Symbol" text box field allows the user to notate individual parametric symbols (to put a text notation next to the parametric symbol/object when it is inserted into the construction plan). The notation will typically also be placed on the price schedule. The "Location" text box field allows the user to notate (to insert a personal remark or notation) the physical location of the parametric symbol in the set of construction plans (e.g. master bedroom, kitchen, living room, bathroom, etc.). The "Remarks" text box field allows the user to make special notations about the parametric symbol, such as Game room or Master Bedroom. The "Distance off Floor" text box field allows the user to specify a measurement value that specifies where the bottom of the parametric symbol is set in relation to a floor, for example, how far a bay window is off of the floor. Advantageously, the plug-in (add-on) computer software code also includes an implementation wherein, upon insertion of a parametric symbol, the implementation indicates whether or not the location of that parametric symbol meets the criteria of a Uniform Building Code (UBC). The plug-in (add-on) computer software code knows the building codes for the various parametric symbols once they are inserted into the construction plan. It knows a window is a window, and that building codes are associated with it. For example, a window 2 feet from a door must be tempered. If a window is inserted less than 2 feet from a door, the computer program would let the user know to temper it. As another example, a 2"×4" 16" on center wall framing can only be used for the first two floors of a structure. Thus, when a $3^{rd}$ floor of a structure is drawn on top of a 2nd floor, and the $1^{st}$ floor is 2"×4" 16" on center, the computer program would let the user know that the $1^{st}$ floor must change to 2"×6"16" on center.

The Properties Dialog also contains three buttons that are present for all parametric symbols, which are: as follows:

Clicking the "OK" button accepts the parametric symbol configuration, closes the Properties Dialog, and makes the appropriate changes in the construction plans;

Clicking "cancel" closes the Properties Dialog, and ignores any changes that were made to parametric symbol properties; and The "help" button allows the user to open the "1stPricing" help system, which offers assistance in using the plug-in (add-on) computer software code, such as how to insert a parametric symbol into a construction plan.

Figure 11:
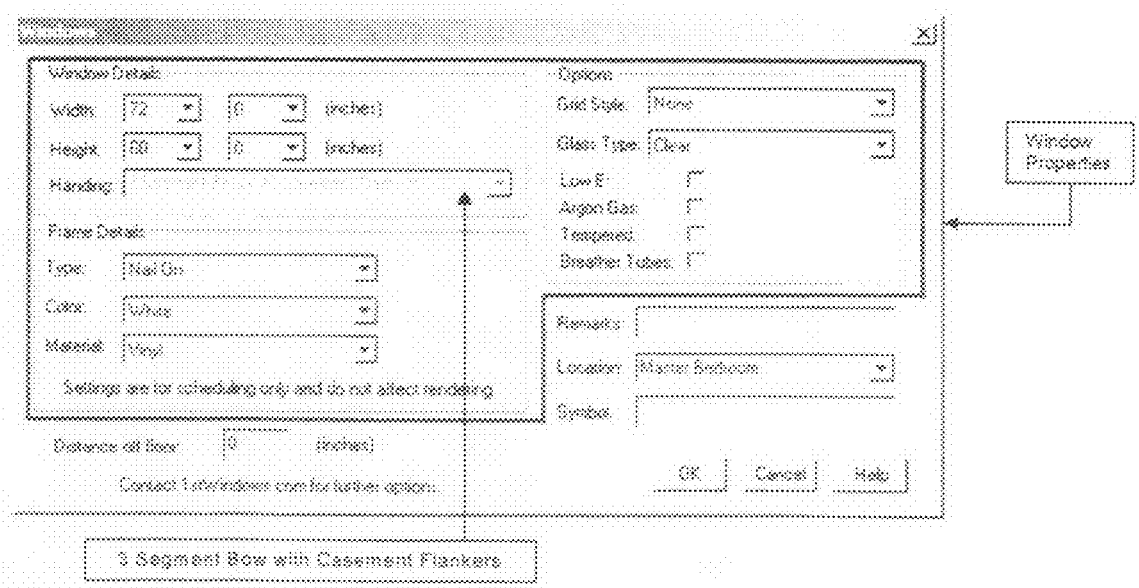
FIGS. 11, 12 and 13 show portions of respective dialogs in accordance with the plug-in (add-on) computer software code of the present invention for windows, acrylic glass blocks and doors, respectively, that specify attributes of particular parametric symbol types, such as the width, height, handling, frame type, color and composition of a window.

Windows Properties (for Windows only)—FIG. 11

As is shown in FIG. 11, "Windows Properties" are specific parametric attributes that pertain specifically to windows. Specific ranges/options for windows may vary for each parametric symbol. As is discussed below, there are three Windows Properties' classifications for windows: (1) Window Details; (2) Frame Details; and (3) Options.

Window Details

The "Width" drop down menus that are located in the Symbols Palette are used to select width of windows in inches and in fractional inch increments. The "Height" drop down menus are used to select the height of windows in inches and in fractional inch increments. The "Handing" drop down menus are used to select the handing (right or left) type for the windows where applicable, such as for a 3 Segment Bow Window with Casement Flankers.

Window Frame Details

The "Type" drop down menu that is located in the Symbols Palette is used to select the window frame type, such as "Nail On" or block frame. The "Color" drop down menu is used to select the window frame color, such as white, black, green or the like. The "Material" drop down menu is used to select the composition of the window frame, such as vinyl, wood, aluminum, fiberglass or wood clad.

Window Options

The "Grid Style" drop down menu that is located in the Symbols Palette is used to select the desired window grid pattern, such as standard pattern flat, standard pattern sculptured, pattern 3a flat or pattern 2 sculptured. The plug-in (add-on) computer software code automatically calculates the grid frequency for a window based upon the size of the window. The "Glass Type" drop down menu is used to select the desired window glass type, such as Azurite, Solar Grey, Glue Chip, Obscured and the like. The "Low E" check box is used to select a Low Emissive Coating on the window glass. The "Argon Gas" check box is used to select Argon Gas filled window glass. The "Tempered" check box is used to select Tempered Glass for the window. The "Breather Tubes" check box is used to select breather tubes for the window.

Acrylic Glass Block Properties (for Acrylic Glass Blocks Only)

FIG. 12

Figure 12:
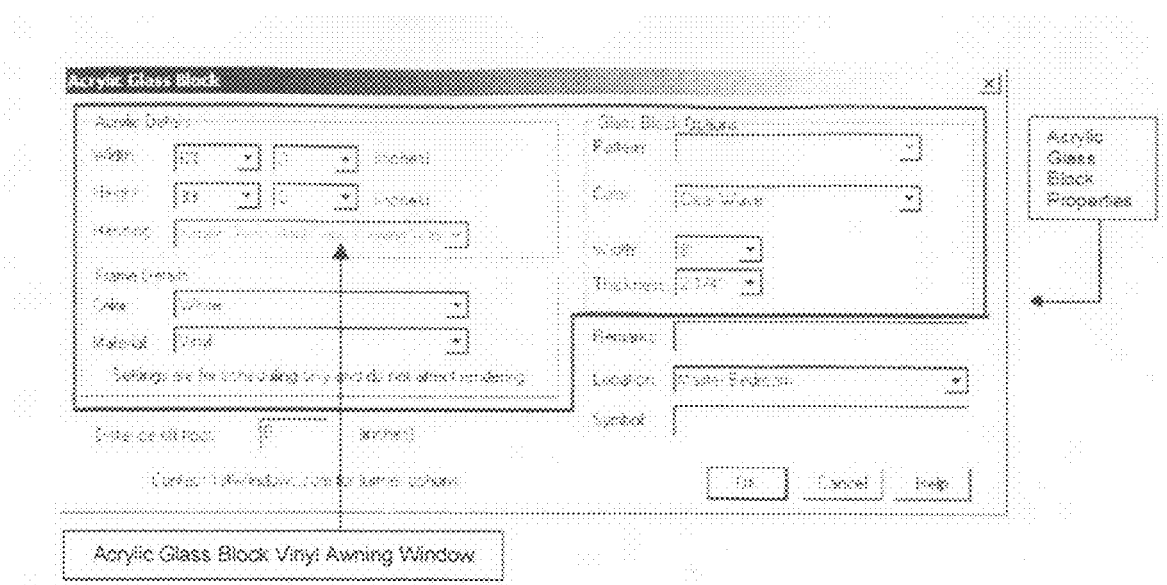

As is shown in FIG. 12, Acrylic Glass Block properties are specific parametric attributes that pertain specifically to acrylic glass blocks. Specific ranges/options for acrylic glass blocks may vary for each parametric symbol. There are three classifications for the acrylic glass blocks: (1) Acrylic Glass Block details; (2) Frame Details; and (3) Options.

Acrylic Glass Block Details

The "Width" drop down menu that is located in the Symbols Palette is used to select width of the acrylic glass block in inches and in fractional inch increments. The "Height" drop down menu is used to select the height of the acrylic glass block in inches and fractional inch increments. The "Handing" drop down menu is used to select the handing (right or left) type of the acrylic glass block where applicable.

Frame Details

The "Color" drop down menu that is located in the Symbols Palette is used to select the acrylic glass block frame color, such as white, black, green, blue or the like. The "Material" drop down menu is use to select the composition of the acrylic glass block frame, such as vinyl, wood, aluminum, fiberglass, wood or clad.

Acrylic Glass Block Options

The "Pattern" drop down menu that is located in the Symbols Palette is used to select the acrylic block pattern, such as diagonal patterns. The "Color" drop down menu is used to select the acrylic glass block color, such as clear wave, frosted wave, green or blue. The "Width" drop down menu is used to select the acrylic glass block width, such as 6". The "Thickness" drop down menu is used to select the acrylic glass block thickness, such as 2¼".

Figure 13:
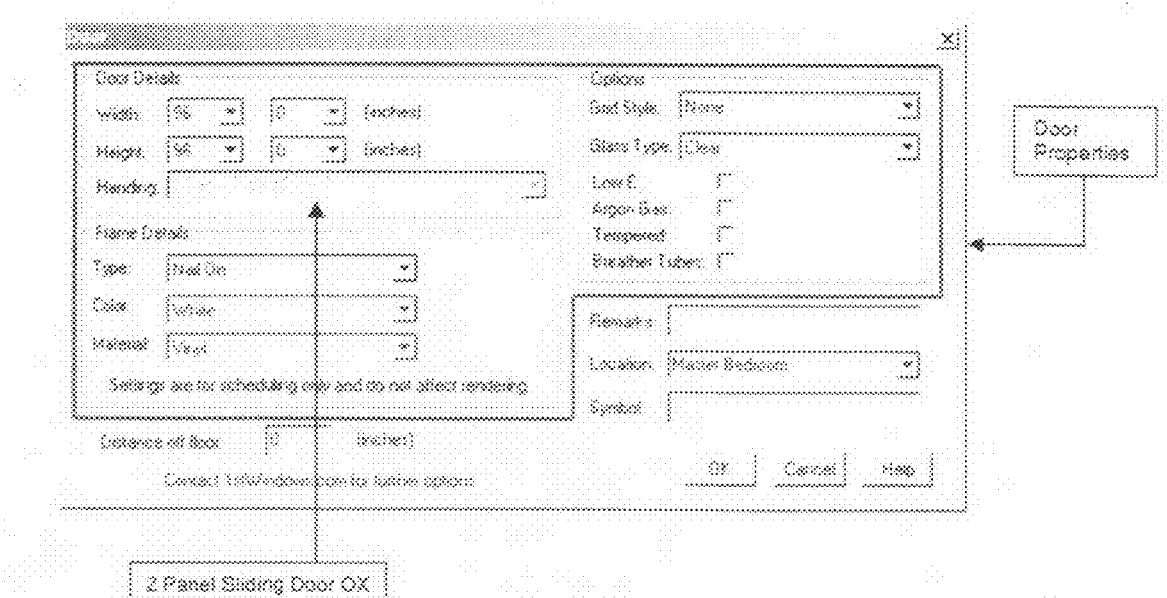

Door Properties (for Doors Only)—FIG. 13

As is shown in FIG. 13, "Door Properties" are specific parametric attributes that pertain specifically to doors. Specific ranges/options for doors may vary for each parametric symbol. There are three classifications for doors: (1) Door Details; (2) Frame Details; and (3) Options.

Door Details

The "Width" drop down menu that is located in the Symbols Palette is used to select width of a door in inches and in fractional inch increments, such as 96". The "Height" drop down menu is used to select the height of a door in inches and in fractional inch increments, such as 96". The "Handing" drop down menu is used to select the handing (right or left) of a door type where applicable, such as for a 2 Panel Siding Door OX. ("OX" means "O" is the stationary panel and "X" is the moving panel as viewed from outside of the door looking in.)

Frame Details

The "Type" drop down menu that is located in the Symbols Palette is used to select the door frame type, such as "Nail On" or block frame. The "Color" drop down menu is used to select the door frame color, such as white, black, blue, red, green or the like. The "Material" drop down menu is used to select the composition of door frame, such as vinyl, wood, aluminum or fiberglass.

Options

The "Grid Style" drop down menu that is located in the Symbols Palette is used to select the desired grid pattern of the door, such as standard pattern flat, standard pattern sculptured, pattern 3a flat or pattern 2 sculptured The plug-in (add-on) computer software code automatically calculates the grid frequency based upon the size of the door. The "Glass Type" drop down menu is used to select the desired door glass type, such as clear, Azurite, Solar Grey, Glue Chip or Obscured. The "Low E" drop down menu is used to select a Low Emissive Coating on the door glass. The "Argon Gas" check box is used to select Argon Gas filled door glass. The "Tempered" check box is used to select Tempered Glass for the door. The "Breather Tubes" check box is used to select breather tubes for the door.

Figures 14, 15:
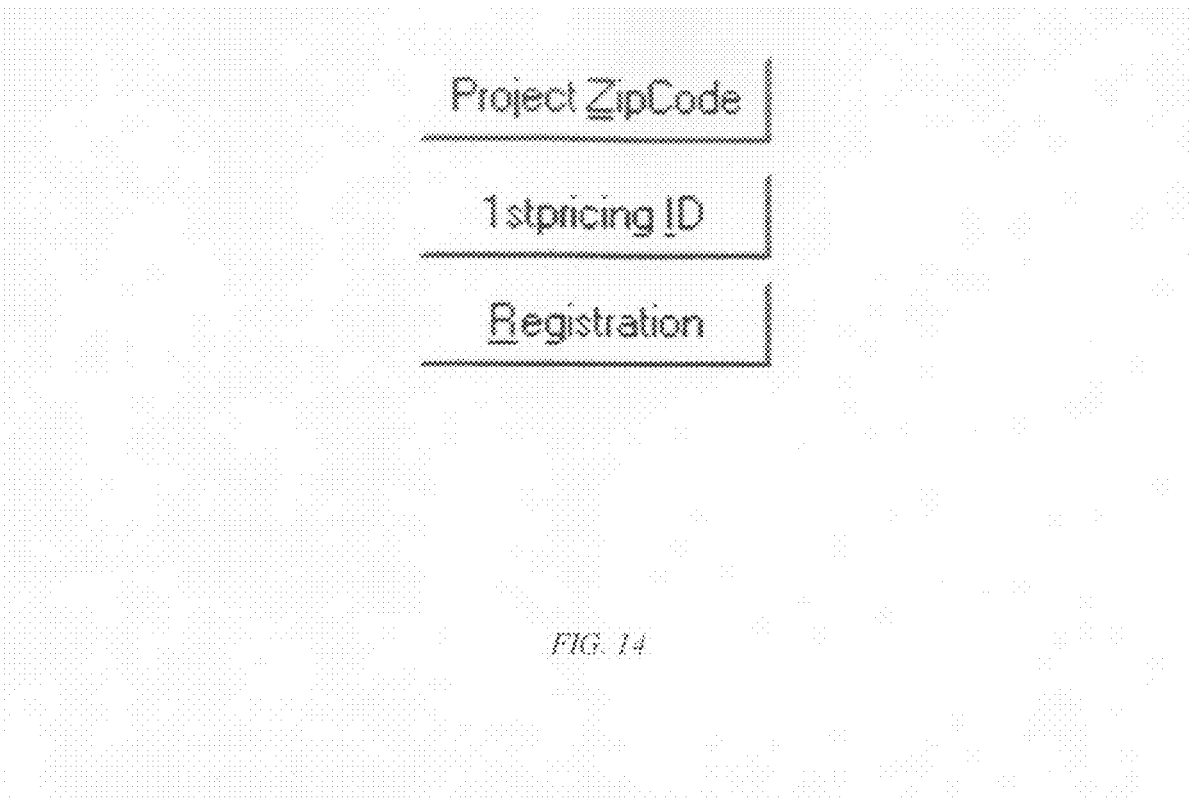
FIG. 14 depicts "Scheduler Controls" that are used with the Parametric Symbol Palette of the plug-in (add-on) computer software code of the present invention.
FIG. 15 depicts the "Registration" dialog that is opened in accordance with the plug-in (add-on) computer software code of the present invention when a user clicks the "Registration" scheduler control button.

Scheduler Controls (Pricing and "Green" Information)—FIG. 14

As is shown in FIG. 14, the "Scheduler Controls" provided by the plug-in (add-on) computer software code are used to create and maintain a price schedule and/or a "green" schedule that is generated using the parametric symbol data that is contained in the construction plans. A price schedule is a detailed part list of the parametric symbols that are contained in the construction plans with appended pricing data. A "green" schedule is a detailed part list of the parametric symbols that are contained in the construction plans with appended statements indicating whether or not the parametric symbols (and corresponding construction plan elements) are "green." The pricing scheduler and "green" scheduler of the present invention typically use an Internet connection to access corresponding pricing data from a remote server system, such as a web site, for example, the online 1stPricing web site. If no Internet connection is present, an open price schedule and/or "green" schedule may be generated, but pricing data and "green" data will typically be absent. Only one piece of data is generally required for the pricing portion of the scheduler to work, which is a ZIP code for the location of the construction project. Only one or more attributes from the inserted parametric symbols are generally required for the "green" data portion of the scheduler to work (i.e. a zip code is not necessary). One control which is accessible from different paths in the pricing scheduler and/or "green" scheduler is used to input this pricing data and/or "green" data. (If the user does not allow one or more parametric symbols to be priced or linked with corresponding "green" data, no list of materials, or corresponding pricing or "green" data, will be provided. However, the user can still draw the objects.)

Pricing and "Green" Data Scheduler Data Controls

As is described below, and as is shown in FIG. 14, three Pricing and "Green" data Scheduler Data Control buttons are used to create and/or update the price scheduler and/or "green" scheduler for accurate operation: (1) Registration Button; (2) Project ZIP Code Button; and (3) 1stPricing ID Button.

Registration Button—FIG. 15

Figure 17:
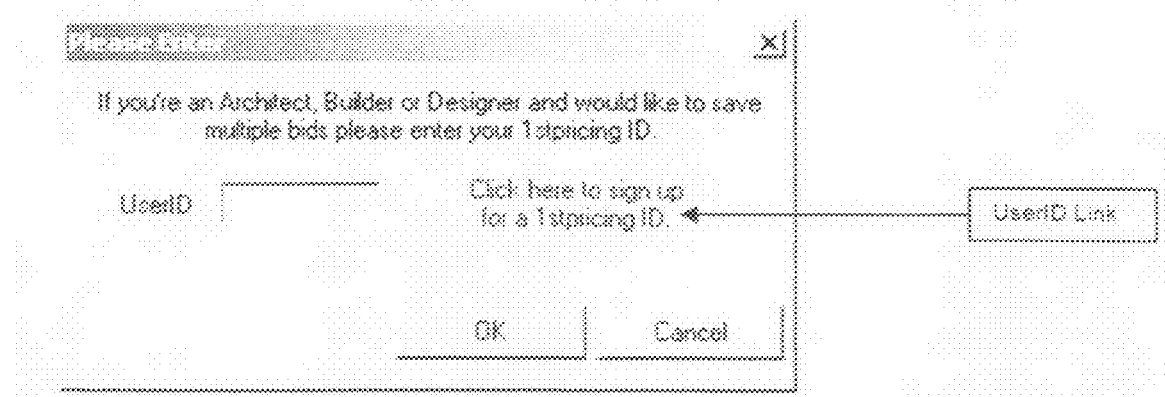
FIG. 17 depicts the "User ID" dialog opened upon actuation of the "Zip Code" scheduler control button in accordance with the plug-in (add-on) computer software code of the present invention.

For new users, clicking the "Registration" button opens up the Registration Dialog that is shown in FIG. 15. To first get to the "Registration" button, the user can also click on the 1stPricing ID button (FIG. 17). The user should then click a "Click here to sign up for a 1stPricing ID" link, which opens up the "Registration" dialog box (FIG. 15), and complete the registration form that appears once the Registration Dialog is opened, which registers the new user with the online 1stPricing web site maintained by 1stPricing. An active Internet connection is typically required for this to work properly. The Registration Dialog typically provides the following controls for entering data: (1) a "First Name" text box (preferably mandatory); (2) a "Last Name" text box (preferably mandatory); (3) a "Company Name" text box; (4) an "Address" text box; (5) a "City" text box; (6) a "State" drop down menu; (7) a "Postal Code" text box; (8) a "Phone" text box; (9) a "Fax" text box; (10) an "Email" text box (preferably mandatory); and (11) an "Email me about updates and special offers" check box. To register the new user with 1stPricing, the user clicks the "Registration" button, fills out the registration form (FIG. 15) and then clicks "OK." A new user confirmation notification is subsequently sent to the new user electronically (via the Internet, a LAN, etc.) or physically (U.S. mail, facsimile, etc.) containing the user information. Such registration creates an online account at the 1stPricing web site maintained by 1stPricing, which can be used for placing orders for construction products, reviewing orders, comparison-shopping among a wide variety of different, and possibly competing, manufacturers and/or distributors that market products within the zip code selected, and obtaining "green" information. This, very advantageously, allows a consumer to procure "green" information and/or the most competitive pricing within a particular zip code for one or more construction products having a wide variety of desired characteristics, for example, a white, vinyl clad, double pane bay window having a specific height, width and depth, a specific number and type of grids, a Low Emissive Coating on the glass, and tempered and Argon gas filled glass, as well as breather tubes.

Figure 16:
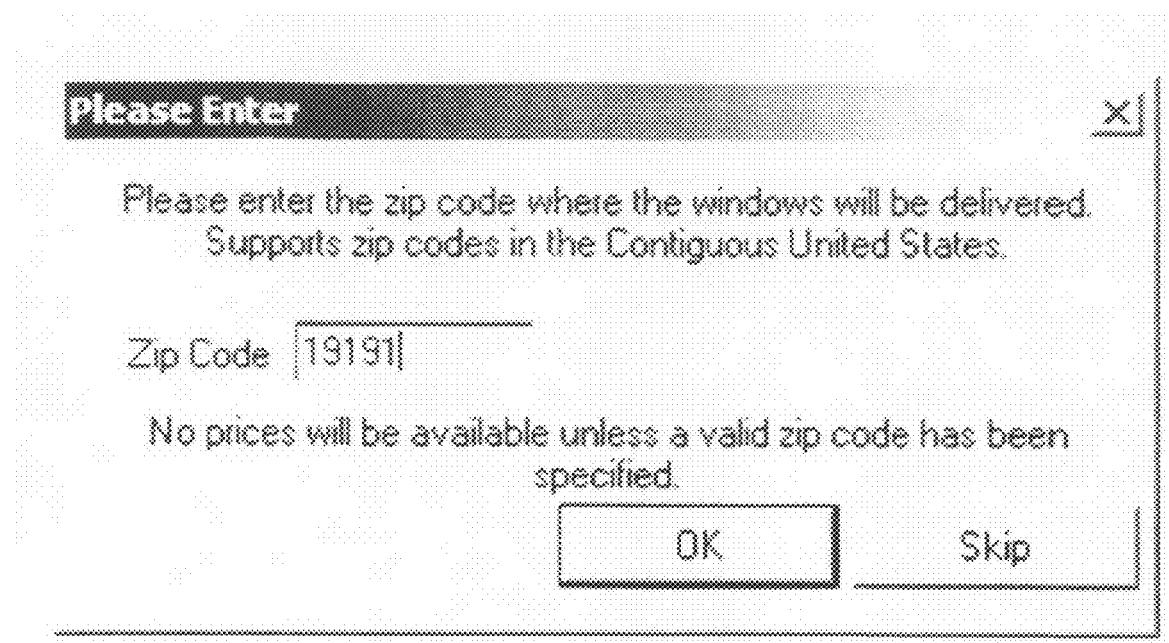
FIG. 16 depicts the "Zip Code" dialog opened upon actuation of the "Zip Code" scheduler control button in accordance with the plug-in (add-on) computer software code of the present invention.

Project ZIP Code Button—FIG. 16

Clicking the "Project ZIP Code" button opens a ZIP Code dialog, as is shown in FIG. 16. The ZIP Code dialog is used to enter the physical zip code of the site of a construction project, which is used to obtain an accurate price quotation and/or "green" information for one or more construction products within that zip code that correspond to one or more parametric symbols that have been inserted into the set of construction plans. The ZIP Code dialog provides two buttons: (1) "OK"; and (2) "Skip." Selecting the "OK" button has the effect of entering the ZIP code into the pricing scheduler and the "green" scheduler. Pressing "Skip" will cause ZIP code changes to be ignored, and the user will be prompted that a correct ZIP code is required for accurate pricing. To properly set the project ZIP code, the user should: (1) click the "Project ZIP Code" button; (2) then, enter the correct ZIP code for the project location; and (3) then, click "OK." A zip code is not necessary if a user only desires to procure "green" information for inserted parametric symbols.

1stPricing ID Button—FIG. 17

Clicking the 1stPricing ID Button opens a "User ID" dialog, as is shown in FIG. 17. This User ID dialog provides a "User ID" text box field, which enables a user to obtain a "1stPricingID." In order to have a 1stPricing ID generated, and set a User ID, the user must typically first have filled out and submitted the Registration Dialog form (FIG. 15), as is described hereinabove. The User ID will typically initially be whatever the user specifies as a User Name on the Registration Dialog form. Clicking the "OK" button (FIG. 17) sets the User ID, closes the dialog, and provides the 1stPricing ID, which is also the set User ID. (The User ID and the 1stPricing ID are the same. The 1stPricing ID is a user ID name that the user has selected himself. He uses it along with a password to save pricing quotes.) The user is then typically sent a user name and Password ID electronically via Internet, e-mail, LAN, facsimile, U.S. mail, or the like. In contrast, clicking the "Cancel" button closes the dialog. To set the User ID as indicated above (and receive a 1stPricing ID), the user clicks the "1stPricing ID" button, and after properly registering, enters a User ID and then clicks "OK."

Parametric Symbol "Scheduler Creation" Controls

FIG. 19

Figures 18, 19:
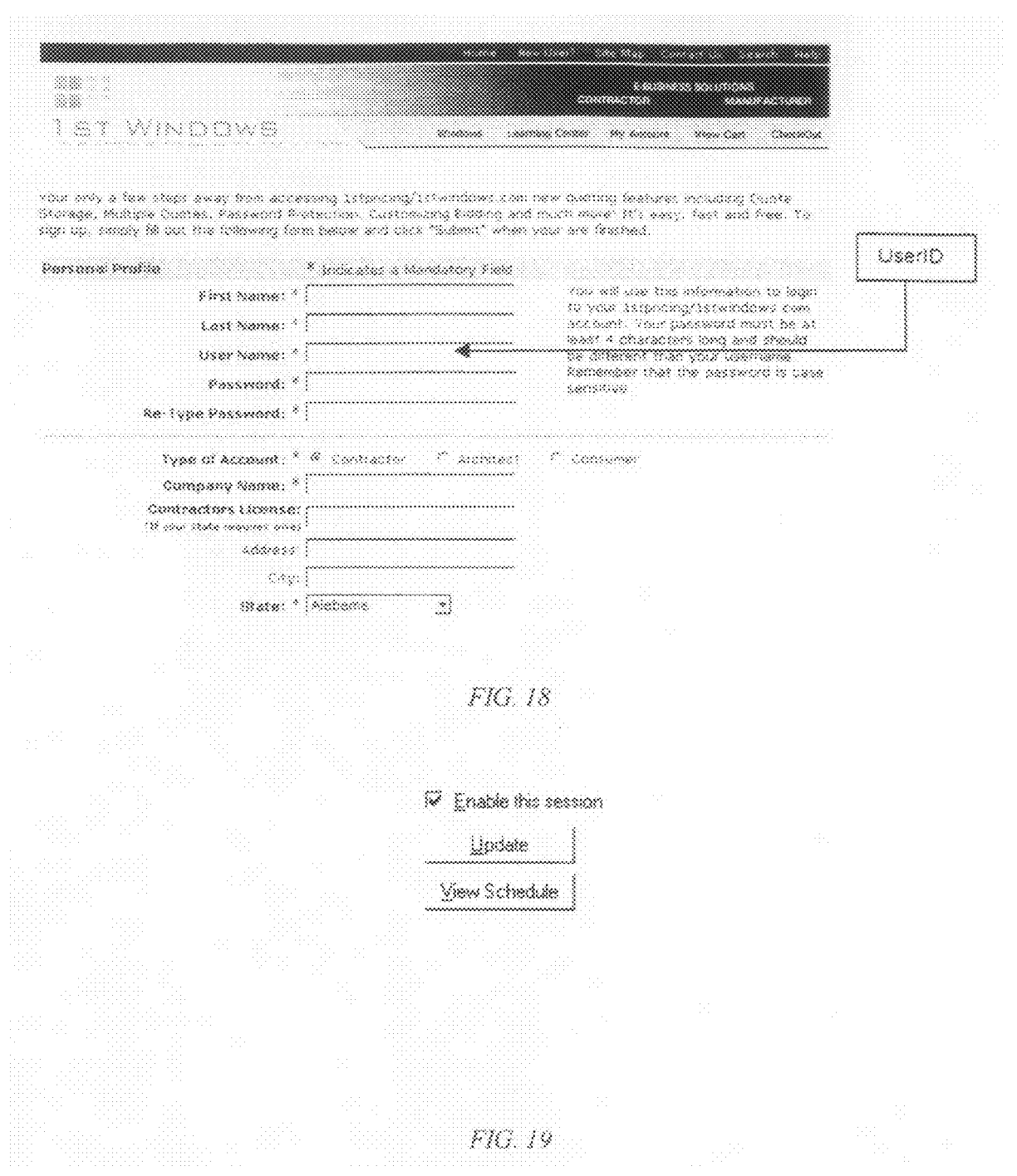

The parametric symbol "Scheduler Creation" controls that are shown in FIG. 19 enable the creation, updating, and viewing of a schedule of selected parametric symbols, and their characteristics, which may include pricing data, "green" statements or both. The "Enable this Session" check box allows the plug-in (add-on) computer software code to connect to one or more online 1stPricing web site (or other designated web site) databases containing: (1) pricing information from at least one to up to about ten or more different manufacturers (for all parametric symbols, and all parameters) to obtain pricing information for selected parametric symbols, and selected parameters (those that have been inserted into the set of construction plans); and/or (2) "green" information (for all parametric symbols, and all parameters) to obtain "green" statements for selected parametric symbols, and selected parameters (those that have been inserted into the set of construction plans). If this box is not checked, the parametric symbol scheduler and user will typically not be able to access a database containing pricing and/or "green" information, and the parametric symbol schedule will be generated without corresponding pricing and "green" data. The "Update" and "View Schedule" buttons are used once a plan has already been priced and/or "green" information has been provided. "Update" will generate a new price schedule and/or a new "green" schedule, and "View Schedule" takes the user to the existing price schedule and "green" schedule.

"Create" and "Update" Parametric Symbol Schedule Buttons

Figures 20, 21:
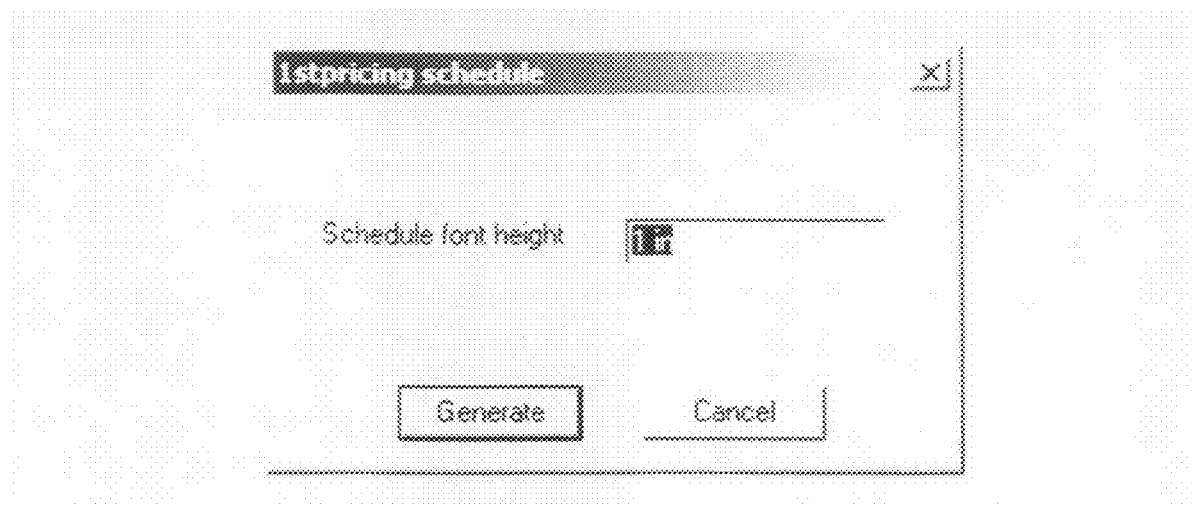
FIG. 20 shows a parametric symbol schedule dialog in accordance with the plug-in (add-on) computer software code of the present invention, which is used to generate a parametric symbol schedule based upon the parametric symbols that have been inserted into a set of construction plans in accordance with the present invention.
FIG. 21 shows details of the parametric symbol schedule of FIG. 20.
Figure 37:
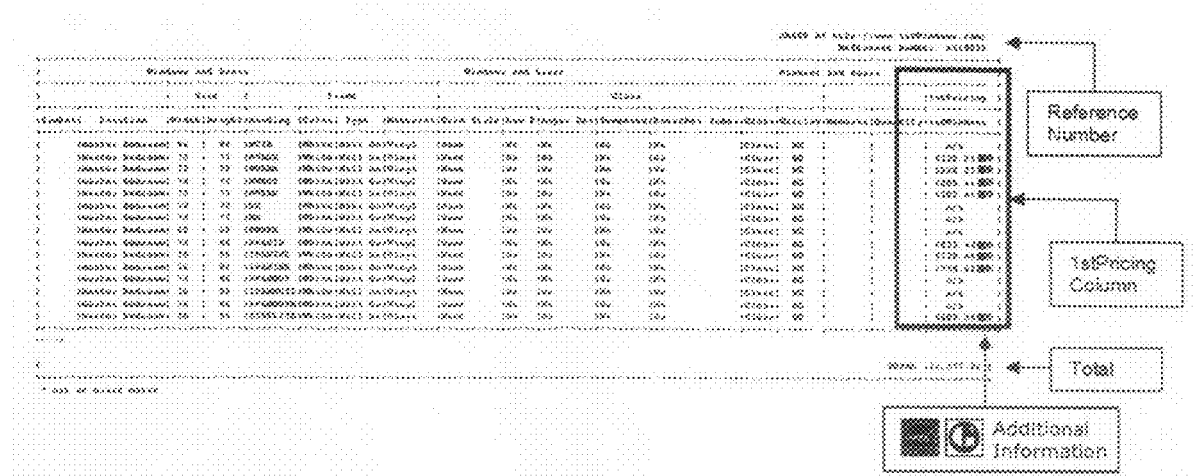
FIG. 37 shows the same details of the parametric symbol schedule of FIG. 20 as is shown in FIG. 21, with the exception that FIG. 37 additionally includes "green" statements for the construction plan elements listed therein.

FIGS. 20 and 37

If no parametric symbol schedule yet exists, the user will see a "Create" button, which is located in the Symbols Palette (FIG. 3). Clicking on this Create button will open a "1stPricing" schedule dialog, as is shown in FIG. 20 and FIG. 37, which includes a "Generate" and a "Cancel" button. This "1stPricing" schedule dialog is used to generate a parametric symbol schedule that is based upon the parametric symbols, and their corresponding characteristics, that have been inserted into the construction plans, and that may include pricing data and/or "green" statements (FIG. 37). This "1stPricing" dialog also prompts the user to input the size of font to be used in the parametric symbol schedule for ease of reading the schedule. The size of the parametric symbol schedule that is generated depends upon the font size used, as well as upon the scale settings that are set by the plan drawer in architectural CAD. Thus, to create a parametric symbol schedule, the "Create" button is clicked, a schedule font height is typed in, and the "Generate" button is clicked. A parametric symbol schedule will then be created, which contains pricing date (FIG. 20) and/or "green" data (FIG. 37). The programming of the communication module, at the 1stPricing web site or 1stWindows web site knows if a user is attempting to procure pricing information, "green" data or both in connection with inserted parametric symbols (i.e., this can be determined from tags that are put into the code when it comes from the plan drawer). The parametric symbol schedule (including a pricing schedule, "green" schedule or both) can then be inserted directly into the construction plans by the plug-in (add-on) computer software code.

If, on the other hand, a parametric symbol schedule already exists, the user will see a different button on the Symbols Palette (FIG. 3) that is labeled "Update," instead of "Create," as well as a button labeled "Export Schedule." Using the "Update" button will have the effect of changing the parametric symbol schedule according to parametric symbol changes that have been made by the user since the creation of the parametric symbol schedule, for example, to change the selected size of a window, or since its last update. In all other respects, this procedure is the same as using the Create button. If the user clicks the "Export Schedule" button (FIG. 3), the user is then asked the file format of the database that the user intends to use (Excel, Plain Text, Word, etc.), and where to save the parametric symbol schedule file on the user's computer.

When a parametric symbol schedule is generated, all of the schedule information is typically saved at the online 1stPricing or other designated web site, and can be accessed by the user using the plans' $1^{st}$ Pricing Reference Number generated by the plug-in (add-on) computer software code. When a user session is enabled, and there is an open Internet or other connection, a "Reference Number" is appended to the parametric symbol schedule. This number can be used to retrieve the parametric symbol schedule at the online 1stPricing or other designated web site.

Some construction products may not be available in an area designated by a ZIP code that is entered by a user. In such an instance, pricing is not always listed for all of the parametric symbols that are inserted into the construction plans, and a "N/A" (not applicable) designation is typically placed into the parametric symbol or price schedule in place of a price.

"View Schedule" Button

Clicking a "View Schedule" button on the Symbols Palette (FIG. 3) will zoom to the part of the architectural CAD drawing of the construction plans where the parametric symbol (or pricing and/or "green") schedule has been inserted. If one or more parametric symbols have been altered without updating the parametric symbol (or pricing and/or "green") schedule, a message will be appended to the schedule that reads the same as, or similar to, the following: "Schedule may not reflect the window specifications." (If windows are not involved, the message will refer to the particular type of parametric symbols or objects that are involved, such as doors, acrylic glass blocks, cabinets, drywall or the like.)

The Schedule

FIGS. 21 and 37

In a resulting price schedule (FIG. 21 and FIG. 37) has unique parametric symbols, such as windows, doors, skylights, cabinets, acrylic block or the like, are listed vertically. Details (characteristics) for each parametric symbol are organized horizontally under the following columns: Symbol, Location, Width, Height, Handing, Color, Type, Material, Grid Style, Low E, Argon Gas, Tempered, Breather Tubes, Glass, Glazing, Remarks, Quantity and Pricing from at least one Manufacturer or Distributor. The same is the case with a resulting "green" schedule (FIG. 37).

Figures 22, 23:
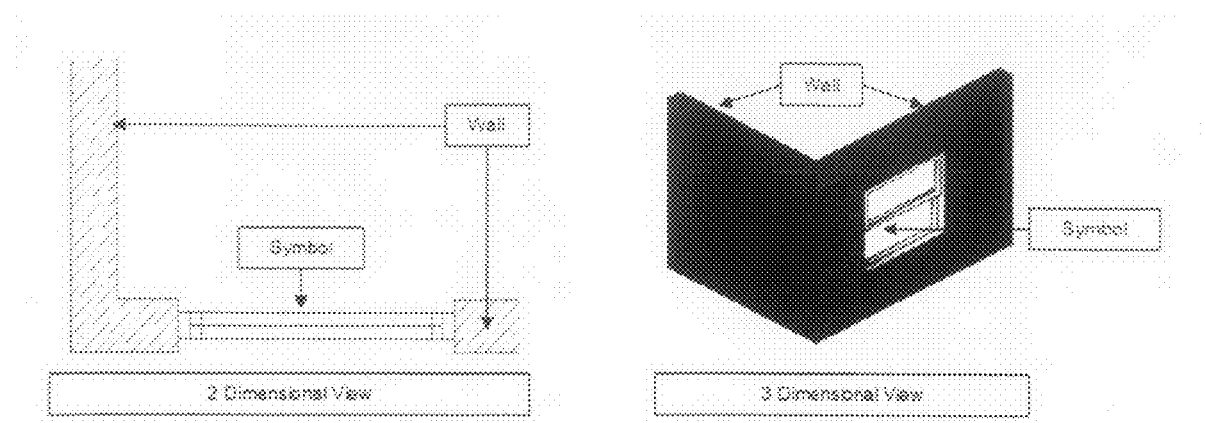
FIG. 22 shows in an architectural CAD "Wall Tools" feature, parametric symbols that are embedded into walls of a structure in accordance with the present invention.
FIG. 23 shows a login screen in accordance with the plug-in (add-on) computer software code of the present invention in which a Reference Number may be inserted, which insertion has the effect of automatically logging a user onto the 1 stPricing or 1 stWindows online database, which provides pricing information for selected parametric symbols (construction elements).

Interaction of Parametric Symbols with CAD Wall Tool—FIG. 22

Very advantageously, as a result of the plug-in (add-on) computer software code, the architectural parametric symbols can be made by the user to auto-imbed into one or more wall depictions that have been created with the architectural CAD computer program, particularly its "Wall Tool," as is shown in the two-dimensional and three-dimensional depictions that are present in FIG. 22. A parametric symbol can be moved from the Symbols Pallet into a selected wall, for example, into a wall in a master bedroom of a house, or into a wall in an office of a commercial building. To insert a parametric symbol into a particular wall, the particular parametric symbol is dragged and dropped to the desired wall location, and then entry is made of the specific parameters that make up the parametric symbol into the construction plans at the site of the desired wall. The properties of the parametric symbols can be modified using the Properties Dialog, as is necessary or desired, and as is described hereinabove. Afterwards, the user clicks "OK." The parametric symbol will automatically, properly and almost instantaneously align with the wall and auto-embed itself into the wall, thereby permitting the user to see how the parametric symbol will look in the wall, or in a room that contains the wall. Appropriate cutouts for the parametric symbol are made in the wall, and the wall will then "heal" around the parametric symbol.

Online Operations

Procuring Price and/or "Green" Information

FIGS. 23, 24, 25 and 26

Figures 24, 25:
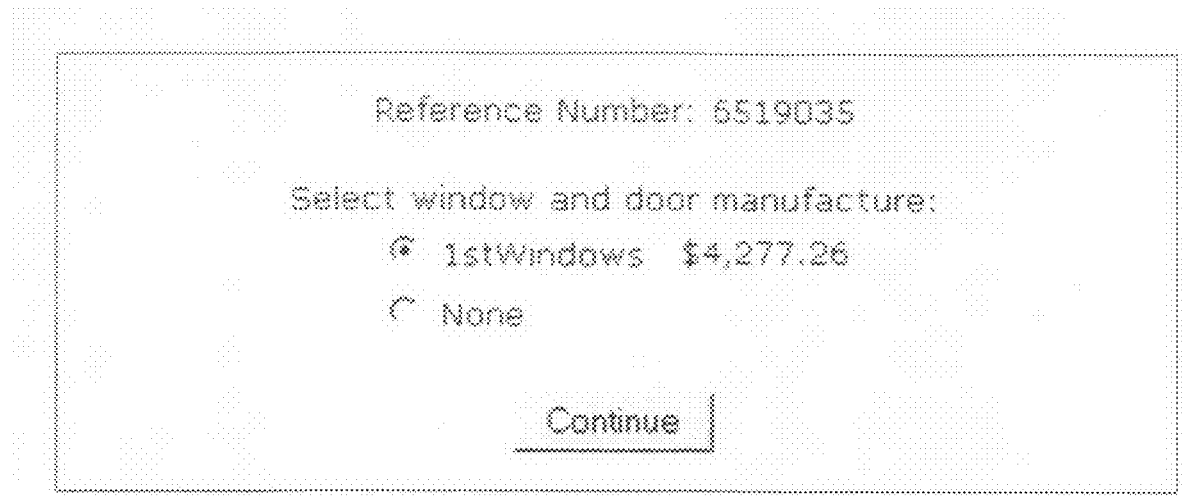
FIG. 24 shows a dialog in the 1stPricing or 1stWindows online database for allowing a user to indicate a type of manufacture in accordance with the present invention.
FIG. 25 shows an exemplary price quote that is generated by the 1stPricing or 1stWindows online database in accordance with the present invention.

As is shown in FIG. 23, the "Reference Number" listed on a 1stPricing Scheduler, such as 6519035, is the name of a price schedule and/or "green" schedule. A Reference Number may be used on the online 1stPricing or other designated web site to access pricing data and/or "green" statements that correspond to a particular parametric symbol schedule. Using the Reference Number will automatically log a user onto this web site. Price schedules and "green" schedules may also be reviewed by logging onto the online 1stPricing or other designated web site by entering the $1^{st}$ Pricing Reference Number and then clicking "Go." Once a pricing schedule and, optionally, a "green" schedule has been displayed, the user may select the type of window, acrylic block, door and/or other type of manufacturer that it would like to receive a price quote from, as is shown in FIG. 24. A price schedule and, optionally, a "green" schedule will typically be presented to the user when the user selects type and "Continue," as is shown in the example that is illustrated in FIG. 25. The user may also access pricing schedules and "green" schedules by entering the User ID and Password that was created for the user during registration, as is described hereinabove. This will provide access to the "My Account" area of this web site. The user's account will contain all of the parametric symbol, price schedules and "green" schedules that have been generated by the registered user. By selecting "View" of the desired price schedule and/or "green" schedule, the user can access the pricing data and/or "green" statements.

If a price schedule and/or "green" schedule needs to be changed, the user can click the "Alter Quote" button, as is shown in FIG. 26, and change the size and/or options for any or all of the products specified in the price schedule and/or "green" schedule.

Comparison Shopping Among Different Manufacturers/Distributors

Figure 27:
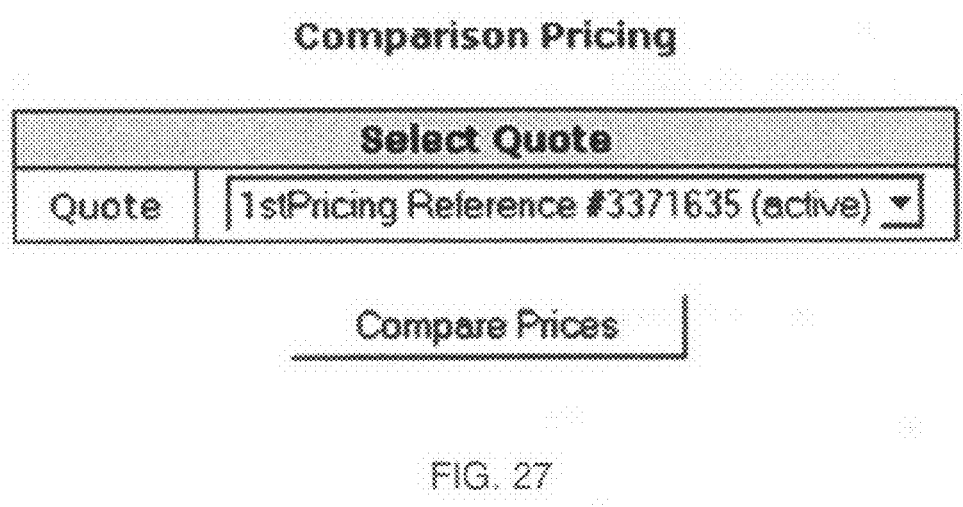
FIG. 27 shows a comparison pricing dialog in the 1stPricing or 1stWindows online database of the present invention that appears when the user clicks on "Compare Prices" in the price quote shown in FIG. 26, and that permits the user to select a particular quote for which comparison pricing for a parametric symbol (construction element) between available manufacturers within a selected zip code will be generated.
Figure 28:
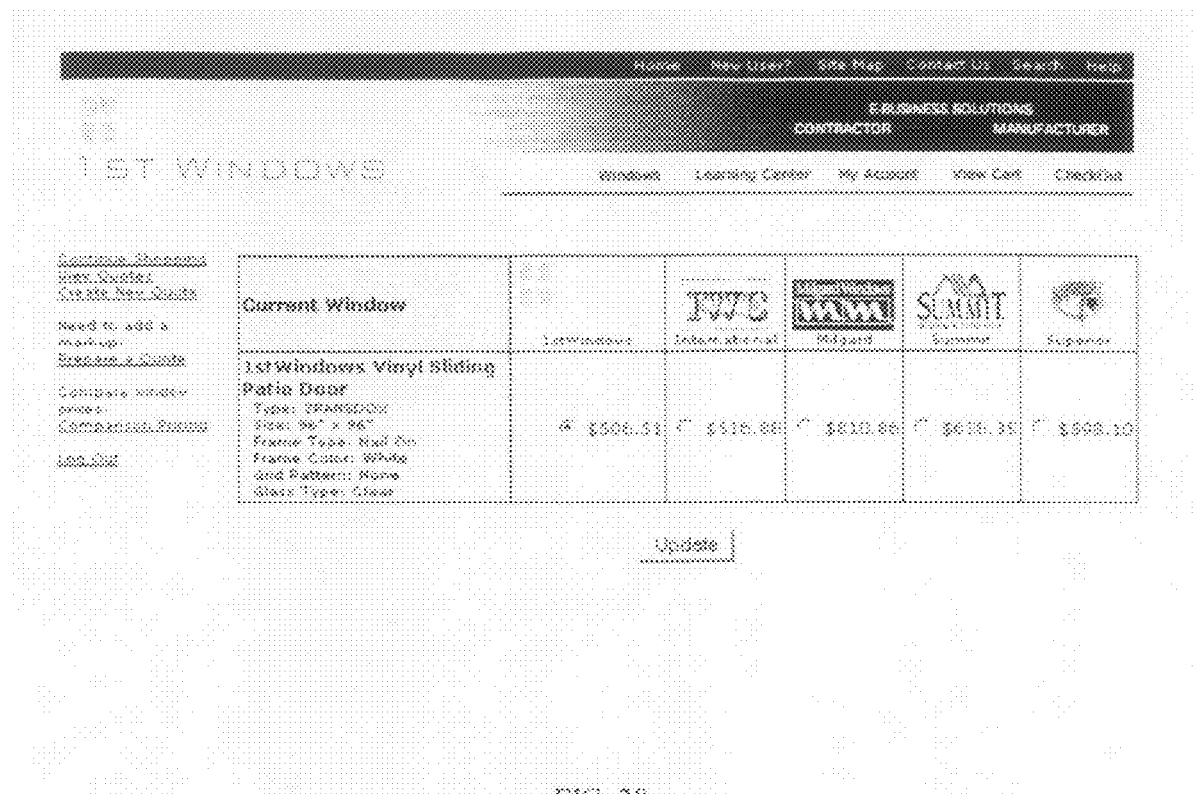
FIG. 28 shows a comparison price quote generated by the 1stPricing or 1stWindows online database in accordance with the present invention when the user clicks on "Compare Prices" in the comparison pricing dialog that is shown in FIG. 26, with five different prices being shown for five different patio door manufacturers in connection with a vinyl sliding patio door having specified features and a specified size.

FIGS. 27 and 28

A tremendous advantage of the present invention is an extended option that is present in the online 1stPricing or other designated web site that permits a user to almost instantaneously (generally within no more than about five seconds) comparison shop for price quotes tailored to a particular parametric symbol schedule among two, three, four, five or even ten or more different window, acrylic glass block, door, sky light and/or other manufacturers and/or distributors that manufacture and/or distribute corresponding construction products within the zip code selected by the user, as is discussed hereinabove. This feature very advantageously permits the user to determine the most competitive or "best" "real time" price for each of the different parametric symbols that are described in the price schedule, which can potentially provide a user with a huge savings of money and/or energy (and associated costs), as well as time spent comparison shopping, and to see a side-by-side comparison of pricing provided by competing manufacturers and/or distributors in all states throughout the United States (i.e., "buy-it-now" pricing at the time of request by the user). The "best" price is a final price that the user can rely on, and that will not change (unless the user makes changes to one or more parametric symbols), which is in stark contrast to an "estimate." As is known by those of skill in the art, a "price" is an assigned amount of money that is required to be paid in order to make a purchase, and an "estimate," in stark contrast, is a rough calculation, an approximation, a judgment or an opinion.

As is shown in FIG. 27, a user can generate a comparison of pricing between available manufacturers/distributors by clicking on "Compare Prices" in the "Comparison Pricing Palette." In addition to prices, manufacturer/distributor information will generally also appear, such as the manufacturer's name, address, phone number, e-mail address and/or the like. For example, the construction product "1 stWindows Vinyl Sliding Patio Door" having particular characteristics and configurations selected by a user is described in FIG. 28 (left side). The center and right portions of FIG. 28 show pricing for this particular construction product (patio door) within the zip code selected by the user by five different patio door manufacturers/distributors (1stWindows, International, Milgard, Summit and Superior). Because these prices for the exact same type of patio door, and "green" ratings and/or certifications, vary widely (from $506.51 at 1stWindows to $636.35 at Summit), this feature very advantageously permits the user to choose the patio door manufacturer/distributor for the construction project that has the most competitive or "best" pricing and a "green" certification. If the user desires to substitute another patio door manufacturer's/distributor's construction product, the user can simply click on the "Radio" button next to the desired price. The price schedule and "green" schedule will then be amended, and the newly selected patio door manufacturer's/distributor's product will then appear in the price schedule and "green" schedule.

The prices that are described herein are final prices that may be used to immediately purchase (on line or otherwise) one or more construction plan elements that are present in a construction plan, such as a window and/or door. The online 1stPricing or other designated web site very advantageously permits architects and other users to rapidly create a precise bill of materials with multiple brands, distributors, line item pricing, line item "green" statements and online purchasing.

Completing the Order and Purchasing the Products

FIGS. 29, 30, 31, 32 and 33

Figure 29:
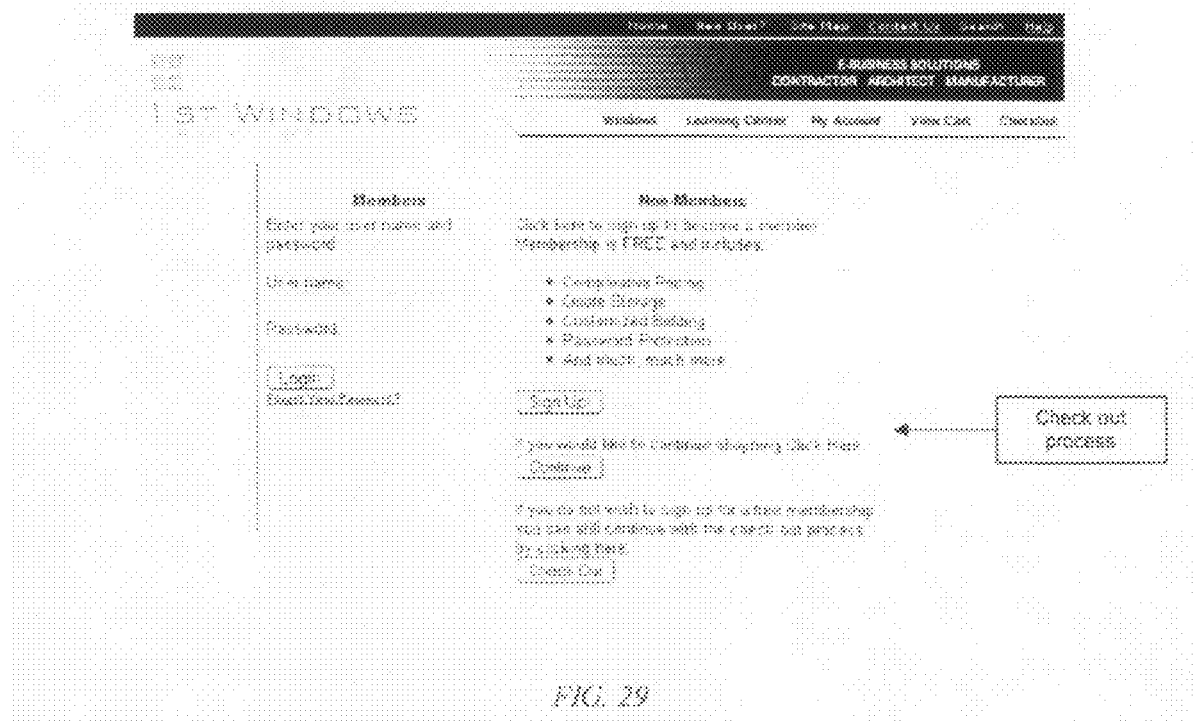
Figure 30:
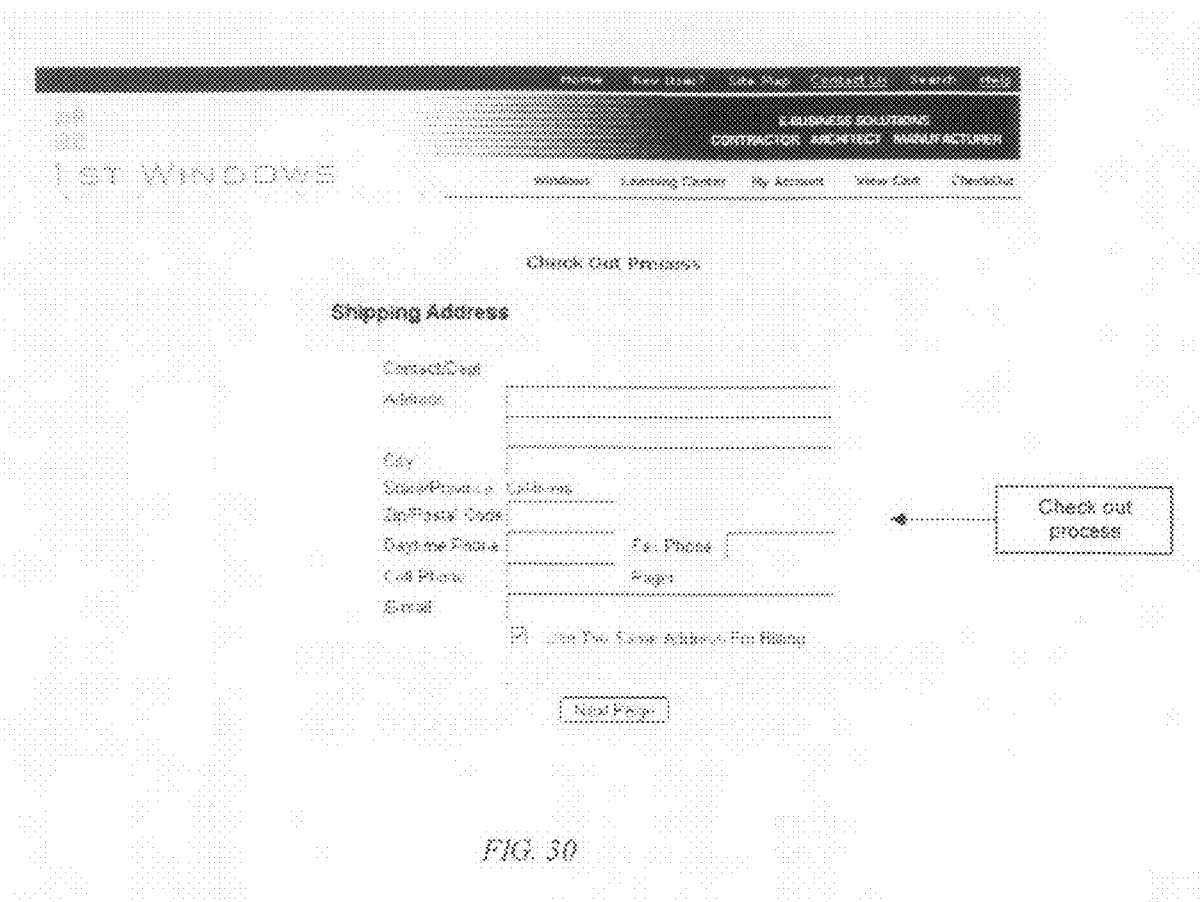

Once a price schedule and/or "green" schedule is completed and verified by the user, the user proceeds to a check out process to purchase the desired construction or other products, such as one or more windows, doors, acrylic glass blocks and/or sky lights. To begin the check out process, the user clicks the "Check Out" button located in the "Check Out" window of the online 1stPricing or other designated web site. If the user either is not a registered user, or is a registered user, but is not logged into the suitable user account, the user will be redirected to a page where the user is given the choice of "Sign Up," "Continue" or "Check Out," which is illustrated in FIG. 29. The user either logs in by inserting the user's User Name and password or, if not a member, just clicks the "Check Out" button at the bottom of a "Non-Member" column located on the Check Out page. In either case, a "Shipping Address" dialog is displayed, as is shown in FIG. 30. The desired shipping information is entered by the user in the fields provided (address, city, state/province, zip postal code, daytime phone, cell phone, e-mail address, facsimile number, pager number and/or the like). If the "Ship to" address and billing address are the same, the user then clicks (checks) the "Use The Same Address For Billing" box. If, however, a separate billing address is required, the user should leave that box unchecked. The user should then click on the "Next Page" button, and a page will be provided on which the user can enter the correct billing address information. When completed, the user should again click on the "Next Page" button.

Figure 31:
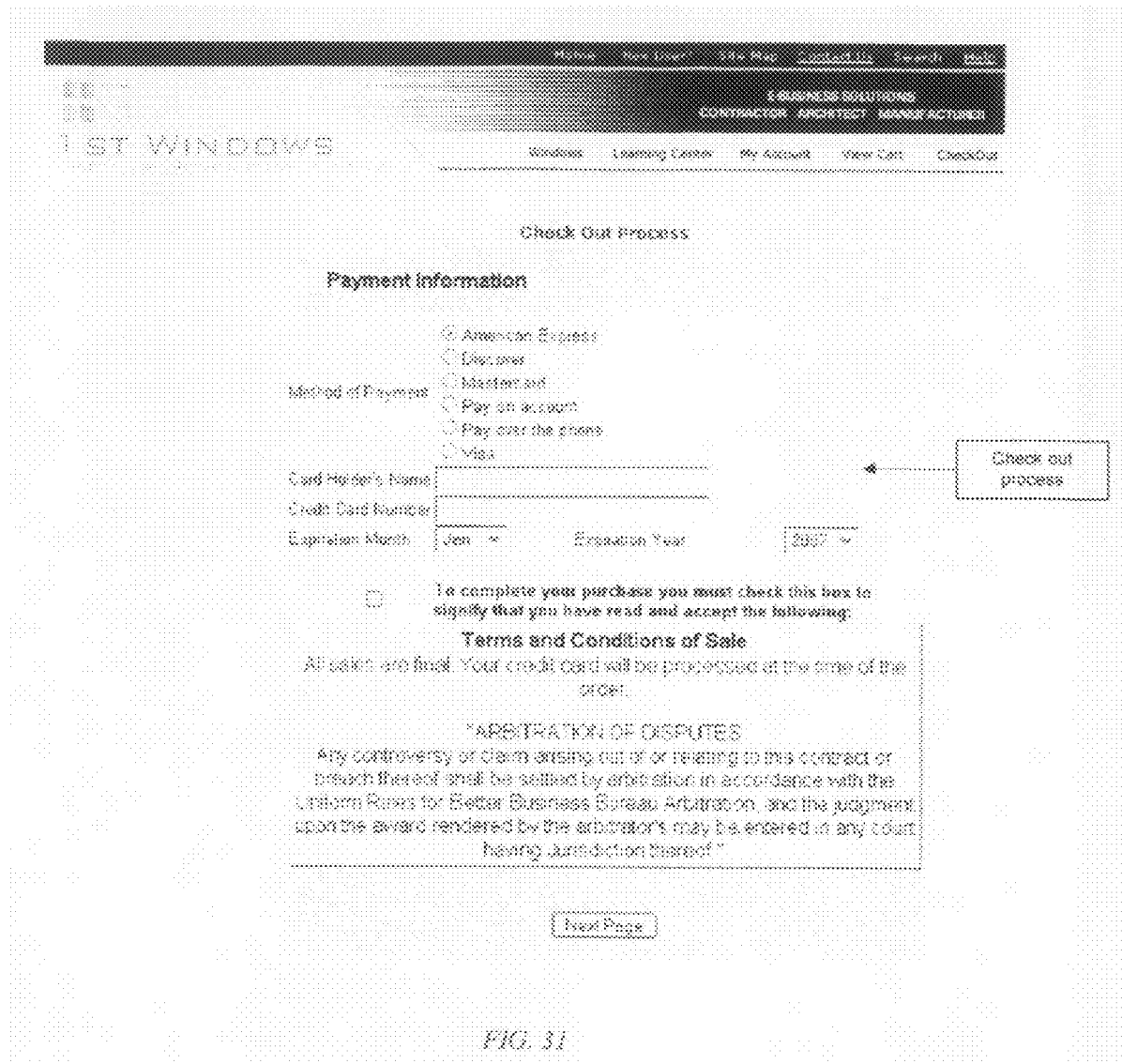

In a second step of the check out process, payment information is entered in the fields of a dialog provided, as is shown in FIG. 31. The user should then read the "Terms and Conditions of Sales" policy that appears, click the box next to the acceptance policy to check it, and click the "Next Page" button. The 1stPricing online or other designated web site preferably accepts American Express, Visa, MasterCard and Discover Card, and all credit card information is transmitted to this web site via a secure server or "pay on account" and "pay over the phone." The user should then click the "Next Page" button to proceed.

Figure 32:
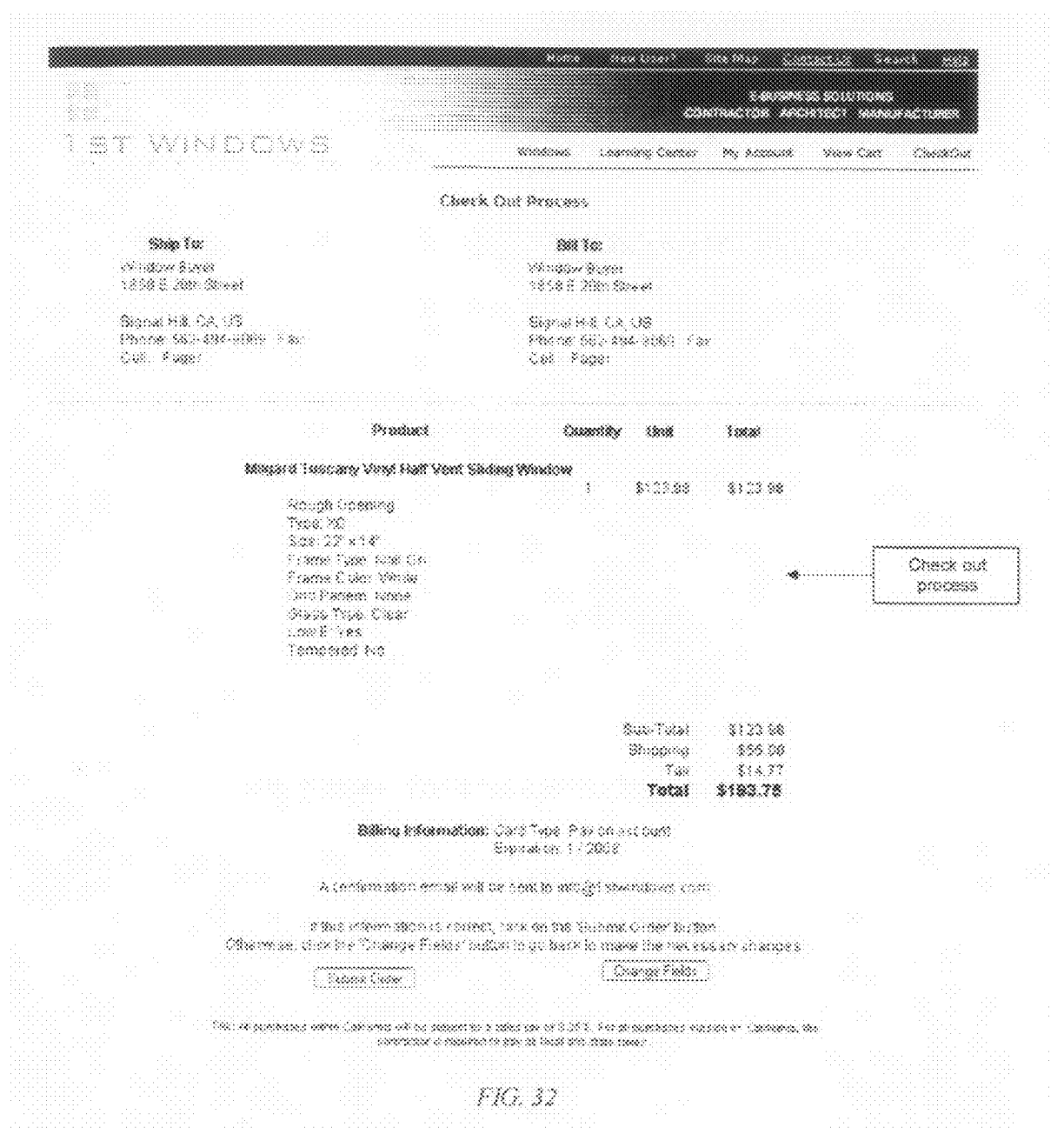
Figure 33:
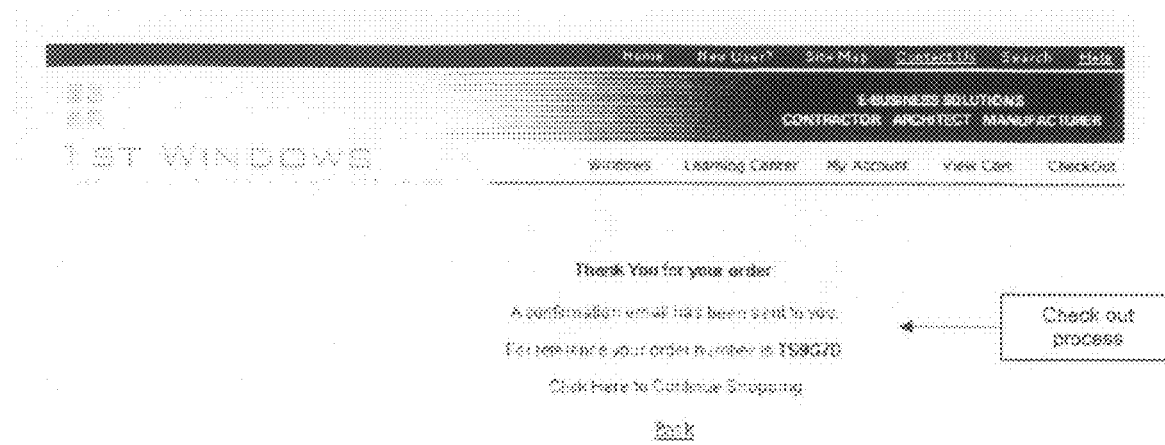

In a final step before placing an order, all of the inputted information will be displayed on the online 1stPricing or other designated web site in a dialog as is shown in FIG. 32, and should be reviewed closely by the user to ensure the accuracy of this information. Once finished, the user should click the "Submit Order" button, or if changes are needed or desired, the "Change Fields" button. The billing address input by the user typically must match the billing address of the credit card employed in order to ensure a successful transaction. In this manner, the ordering process is completed. An order acknowledgment dialog, as is shown in FIG. 33, will typically then display the order Reference Number, and an e-mail message will typically be sent to the user showing the contents of the user's order. A customer service representative will typically contact the user within 24 to 48 hours to verify all facets of the user's order. Once this step has been completed, the order will be placed, the provided credit card will be charged, and the construction or other products ordered will be manufactured or ordered from a selected distributor, and then shipped to the construction site (or to some other desired location).

Figure 34:
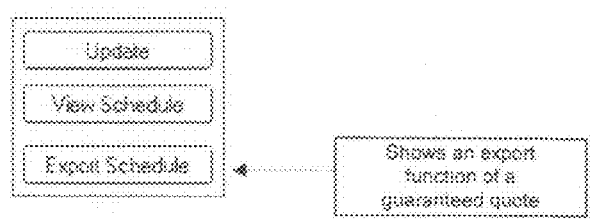

Exportation of a Price Schedule—FIG. 34

As is shown in FIG. 34, an export function of a generated price schedule (FIGS. 21 and 37) in the online 1stPricing or other designated web site online database permits the price schedule to be exported as a standalone object into a database in the form of various common computer applications or formats including, but not limited to, Excel, Word, Plain Text, HTML, XML and/or the like. The same is true of a "green" schedule (FIG. 37).

Dynamic Product Cart Technology

In contrast with a "Static Product Cart" technology, the present invention is a new "Dynamic Product Cart" technology having the features that are described below.

Characteristics of the "Dynamic Product Cart" Technology

It is not a "standard" (traditional) "off the shelf" type of shopping cart technology that can be purchased commercially for selling standard products. In contrast, it is a "custom" shopping cart technology that has intelligence. ("Off the shelf" shopping cart technology does not know where a user is located at the time of pricing. It prices an object, such as a book, and then asks the user for his address to calculate shipping charges. In contrast, the present invention asks a user for his zip code and then prices one or more products. Product price can be different in every zip code. For example, the price for an identical windows may be more in Beverly Hills, Calif., than in Long Beach. (This is known as "dynamic" pricing.) Then, the shipping cost is calculated.

Its pricing system can perform complex calculations "on the fly" (on demand). With this system, each building material manufacturer/distributor (which generally employs a different method for pricing its products, and product options) can develop a unique pricing scheme that can be programmed into the system. The system can then calculate, for example, square footage pricing, linear footage pricing, perimeter footage pricing, one time fees and/or one time fees based upon an independent variable being added (if then statement) on top of adding the base unit list price for the building material according to zip code.

Pricing glass may be by the square foot, whereas pricing block frame can be by the perimeter foot, or a one time fee, with slope still calculated by length. A user may key in a product type with specific options by, for example, clicking "Add to Cart." The system can then calculate the price on demand. In the case of architectural CAD, a list of options may be sent to a database, with the specifications then being calculated to provide line-item pricing. This "on demand" type pricing permits the pricing of virtually millions of different pricing demands, typically in just seconds. New construction, flush fin, block, windows having slope sill frames and different types of glass, and thicknesses thereof, can be priced in this manner. For example, a $71^{15}/_{16} \times 47^{3}/_{8}$ inch net frame size full casement bay window having paint grade head and seat board, fold down cranks with low E, gray and $3/16$" thick glass would compute a base list of window size and add the one time fee for the head and seat board, add the one time price for the folding crank handles, add a square footage charge for Low E and gray glass, and then add a $3/16$" glass thickness square foot charge. Additionally, grids on top window panels only, and windows tempered on the bottom vent only, can be priced. It also permits a user to order "rough opening" size windows (using a stud to stud measurement) in comparison with "net frame size" windows (in which the size that is ordered is the size that is produced).

Shipping costs, as set forth by a manufacturer (a one time fee or a fee that changes as an order increases in size), can be calculated.

It can be used to price products other than windows (alone or in addition to windows), and is not limited to "new construction" and/or "standard size" windows or products. It can provide a price quote for a wide variety of "custom" products.

It can produce a price quote for more than one type of building material, for example, for a kitchen window, a front door and a garage door.

It can produce, or alter, the prices for more than one type of building material, whether the same or different, with more than one feature, for example, a window that has gray glass and Low E glass, and has a glass thickness of $1/4$", and has a block frame, and measures 8'×4' in size, and has a horizontal grid pattern (one, two, three, four, five or all six of these characteristics).

Comparison pricing of products (i.e. for the same product using a wide variety of different product manufacturers) can be performed.

Items within any zip code region within the United States can be priced.

Zip codes are used.

This technology uses a software design tool.

This technology uses a plug-in (add-on) computer software code.

Architectural parametric symbols are inserted into a construction plan.

A price schedule is created from architectural CAD objects.

As is described hereinabove, the methods and systems of the present invention (both the pricing features and the "green" features) are revolutionary, and solve many of the problems that have long been associated with previous type devices.

Sources of Materials

All of the materials and equipment that are employed in the methods and systems of the present invention are commercially available from sources that are known by those of ordinary skill in the art.

While the present invention has been described herein with specificity, and with reference to certain preferred embodiments thereof, those of ordinary skill in the art will recognize numerous variations, modifications and substitutions of that which has been described which can be made, and which are within the scope and spirit of the invention. It is intended that all of these modifications and variations be within the scope of the present invention as described and claimed herein, and that the invention be limited only by the scope of the claims which follow, and that such claims be interpreted as broadly as is reasonable.

Throughout this document, various patents, web sites and/or other publications have been cited. The entireties of each of these patents, web sites and other publications are hereby incorporated by reference herein.

What is claimed is:

1. An automated method for creating a schedule for one or more construction plan elements of a construction project that states whether or not the construction plan elements meet predetermined environmental or efficiency criteria, or both, comprising:

(a) providing on a local computer an architectural software design tool and a construction plan drawing having at least one construction plan element, wherein the construction plan drawing is created with the architectural software design tool;

(b) providing on the local computer an add-on computer software code that runs as an internal component within the architectural software design tool, and that includes a palette containing one or more parametric symbols, and optionally one or more corresponding parametric symbol values, wherein the palette includes a parametric symbol for each of the construction plan elements;

(c) selecting one or more of the parametric symbols that is included in the palette for insertion into the construction plan drawing;

(d) inserting one or more of the selected parametric symbols into the construction plan drawing;

(e) using the add-on computer software code and an Internet connection, transmitting data corresponding to each of the inserted parametric symbols from the local computer to a remote server system, either directly or via an optional communication module;

(f) using the add-on computer software code and an Internet connection, accessing data from a web site present on the remote server system that includes data for construction plan elements corresponding to inserted parametric symbols, wherein the data states whether or not the construction plan elements meet predetermined environmental or efficiency criteria, or both; and (g) using the add-on computer software code, creating a schedule from the data, wherein the schedule states for each construction plan element corresponding to an inserted parametric symbol whether or not the construction plan element meets predetermined environmental or efficiency criteria, or both.

2. The method of claim 1 wherein the method comprises an additional step of inserting the schedule into the construction plan drawing.

3. The method of claim 1 wherein the schedule contains a list of the construction plan elements corresponding to inserted parametric symbols with corresponding statements indicating whether or not the construction plan elements meet predetermined environmental or efficiency criteria, or both.

4. The method of claim 1 wherein the architectural software design tool is a CAD software product.

5. The method of claim 1 wherein the construction plan elements are selected from a group comprising at least one of a window, a door and an acrylic glass block.

6. The method of claim 1 wherein the method comprises an additional step of placing an order to purchase one or more of the construction plan elements that are present in the schedule.

7. The method of claim 6 wherein the order is placed using the local computer or the web site on the remote server, or both.

8. The method of claim 1 wherein the method creates the price schedule including one or two construction plan elements.

9. The method of claim 1 wherein the construction plan drawing includes one or more walls, and wherein one or more of the inserted parametric symbols automatically aligns with a wall.

10. The method of claim 9 wherein the one or more inserted parametric symbols additionally automatically auto-embeds itself into the wall.

11. The method of claim 1 wherein one or more parametric symbol values are selected.

12. The method of claim 11 wherein one or more of the selected parametric symbol values is modified after a corresponding parametric symbol has been inserted into the construction plan drawing.

13. The method of claim 1 wherein, after the schedule is created, one or more changes is made to one or more of the inserted parametric symbols, and the schedule is automatically edited to correspond to the changes.

14. The method of claim 1 wherein the schedule created is exported into a separate database.

15. The method of claim 1 wherein the web site is an online web site or a remote server system.

16. The method of claim 1 wherein a communication module is not employed.

17. The method of claim 1 wherein a communication module is employed.

18. An automated system for creating a schedule for one or more construction plan elements of a construction project that states whether or not the construction plan elements meet predetermined environmental or efficiency criteria, or both, comprising:

(a) a local computer;

(b) an architectural software design tool, wherein the architectural software design tool provides on the local computer a construction plan drawing having at least one construction plan element;

(c) a remote server system having a web site that maintains a database including data for the construction plan elements, wherein the data states whether or not the construction plan elements meet predetermined environmental or efficiency criteria, or both, and wherein an Internet connection exists between the remote server system and the local computer; and (d) an add-on computer software code that runs as an internal component within the architectural software design tool on the local computer;

wherein the add-on computer software code has a palette that includes at least one parametric symbol that corresponds with each of the construction plan elements, and that may be selected by a user for insertion into the construction plan drawing; and wherein the add-on computer software code when executed by the local computer:

(i) inserts at least one of the parametric symbols that are selected by a user into the construction plan drawing;

(ii) transmits via the Internet connection data corresponding to each inserted parametric symbol from the local computer to the remote server system, either directly or via an optional communication module;

(iii) receives via the Internet connection from the remote server system for each of the construction plan elements corresponding to an inserted parametric symbol a statement or other indication as to whether or not the construction plan elements meet predetermined environmental or efficiency criteria, or both, either directly or via an optional communication module; and (iv) generates a schedule from the statements, wherein the schedule includes a statement for each construction plan element corresponding to an inserted parametric symbol indicating whether or not the construction plan element meets predetermined environmental or efficiency criteria, or both.

19. The system of claim 18 wherein the schedule becomes inserted into the construction plan drawing.

20. The system of claim 18 wherein the schedule contains a list of the construction plan elements corresponding to inserted parametric symbols with corresponding statements indicating whether or not the construction plan elements meet predetermined environmental or efficiency criteria, or both.

21. The system of claim 18 wherein the architectural software design tool is a CAD software product.

22. The system of claim 18 wherein the construction plan elements are selected from a group comprising at least one of a window, a door and an acrylic glass block.

23. The system of claim 18 wherein the add-on computer software code additionally confirms that each inserted parametric symbol meets criteria of a building code.

24. The system of claim 18 wherein the system permits a user to place an order to purchase one or more of the construction plan elements that are present in the schedule.

25. The system of claim 24 wherein the order is placed using the local computer or the web site on the remote server, or both.

26. The system of claim 18 wherein the schedule includes one or two construction plan elements.

27. The system of claim 18 wherein the schedule includes two or more construction plan elements.

28. The system of claim 18 wherein the construction plan drawing includes one or more walls, and wherein one or more of the inserted parametric symbols automatically aligns with a wall.

29. The system of claim 28 wherein the one or more inserted parametric symbols additionally automatically auto-embeds itself into the wall.

30. The system of claim 18 wherein the system has one or more selected parametric symbol values.

31. The system of claim 30 wherein the system permits one or more of the selected parametric symbol values to be modified after a corresponding parametric symbol is inserted into the construction plan drawing.

32. The system of claim 18 wherein, after the schedule is created, the system permits one or more changes to be made to one or more of the inserted parametric symbols, and the schedule to be automatically edited to correspond to the changes.

33. The system of claim 18 wherein the system permits the schedule created to be exported into a separate database.

34. The system of claim 18 wherein the web site is an online web site or a remote server system.

35. The system of claim 18 wherein a communication module is not employed.

36. The system of claim 18 wherein a communication module is employed.

37. An automated method for creating for one or more construction plan elements of a construction project both a price schedule and a schedule that states whether or not the construction plan elements meet predetermined environmental or efficiency criteria, or both, comprising:
(a) providing on a local computer an architectural software design tool and a construction plan drawing having at least one construction plan element, wherein the construction plan drawing is created with the architectural software design tool;
(b) providing on the local computer an add-on computer software code that runs as an internal component within the architectural software design tool, and that includes a palette containing one or more parametric symbols, and optionally one or more corresponding parametric symbol values, wherein the palette includes a parametric symbol for each of the construction plan elements;
(c) selecting one or more of the parametric symbols that is included in the palette for insertion into the construction plan drawing;
(d) optionally, selecting one or more parametric symbol values for one or more of the selected parametric symbols;
(e) optionally, selecting one or more types of manufacturers or distributors for one or more of the selected parametric symbols;
(f) inserting one or more of the selected parametric symbols into the construction plan drawing;
(g) using the add-on computer software code and an Internet connection, transmitting data corresponding to each of the inserted parametric symbols from the local computer to a remote server system, either directly or via an optional communication module;
(h) using a zip code, the add-on computer software code and an Internet connection, accessing price data from a web site present on the remote server system that includes price data for a purchase of construction plan elements corresponding to inserted parametric symbols from one or more available manufacturers or distributors in a geographical location within the zip code, and using the add-on computer software code and the Internet connection, accessing data from the web site that states whether or not the construction plan elements meet predetermined environmental or efficiency criteria, or both;
(i) determining from the price data a price for each of the construction plan elements corresponding to an inserted parametric symbol; and
(j) using the add-on computer software code when executed by the local computer:
 (1) creating a price schedule from the prices, wherein the price schedule includes a total cost for all of the construction plan elements corresponding to inserted parametric symbols, wherein the price schedule can include one or more construction plan elements, and wherein the price schedule may be immediately used on the local computer to place an order to purchase one or more construction plan elements that are present in the price schedule; and
 (2) creating a schedule from the data that states whether or not the construction plan elements meet predetermined environmental or efficiency criteria, or both, wherein the schedule states for each construction plan element corresponding to an inserted parametric symbol whether or not the construction plan element meets predetermined environmental or efficiency criteria, or both.

38. The method of claim 37 wherein the method comprises an additional step of inserting the price schedule, the schedule stating whether or not the construction plan elements meet predetermined environmental or efficiency criteria, or both, or both schedules into the construction plan drawing.

39. The method of claim 37 wherein the price schedule, the schedule stating whether or not the construction plan elements meet predetermined environmental or efficiency criteria, or both, or both schedules contain a list of the construction plan elements corresponding to inserted parametric symbols with corresponding prices or statements indicating whether or not the construction plan elements meet predetermined environmental or efficiency criteria, or both.

40. The method of claim 37 wherein the architectural software design tool is a CAD software product.

41. The method of claim 37 wherein the construction plan elements are selected from a group comprising at least one of a window, a door and an acrylic glass block.

42. The method of claim 37 wherein the method comprises an additional step of placing an order to purchase one or more of the construction plan elements that are present in one or both of the schedules.

43. The method of claim 37 wherein the order is placed using the local computer or the web site on the remote server, or both.

44. The method of claim 37 wherein the method creates one or both of the schedules including one or two construction plan elements.

45. The method of claim 37 wherein the construction plan drawing includes one or more walls, and wherein one or more of the inserted parametric symbols automatically aligns with a wall.

46. The method of claim 45 wherein the one or more inserted parametric symbols additionally automatically auto-embeds itself into the wall.

47. The method of claim 37 wherein one or more parametric symbol values are selected.

48. The method of claim 47 wherein one or more of the selected parametric symbol values is modified after a corresponding parametric symbol has been inserted into the construction plan drawing.

49. The method of claim 37 wherein, after one or both of the schedules are created, one or more changes is made to one or more of the inserted parametric symbols, and the created schedules are automatically edited to correspond to the changes.

50. The method of claim 37 wherein one or both of the schedules are exported into a separate database.

51. The method of claim 37 wherein the web site is an online web site or a remote server system.

52. The method of claim 37 wherein a communication module is not employed.

53. The method of claim 37 wherein a communication module is employed.

54. An automated system for creating for one or more construction plan elements of a construction project both a price schedule and a schedule that states whether or not the construction plan elements meet predetermined environmental or efficiency criteria, or both, comprising:
   (a) a local computer;
   (b) an architectural software design tool, wherein the architectural software design tool provides on the local computer a construction plan drawing having at least one construction plan element;
   (c) a remote server system having a web site that maintains one or more databases for the construction plan elements including pricing data and data indicating whether or not the construction plan elements meet predetermined environmental or efficiency criteria, or both, wherein an Internet connection exists between the remote server system and the local computer; and
   (d) an add-on computer software code that runs as an internal component within the architectural software design tool on the local computer;
wherein the add-on computer software code has a palette that includes at least one parametric symbol that corresponds with each of the construction plan elements, and that may be selected by a user for insertion into the construction plan drawing; and
wherein the add-on computer software code when executed by the local computer:
   (i) inserts at least one of the parametric symbols that are selected by a user into the construction plan drawing;
   (ii) transmits via the Internet connection data corresponding to each inserted parametric symbol from the local computer to the remote server system;
   (iii) receives via the Internet connection from the remote server system for each of the construction plan elements corresponding to an inserted parametric symbol:
      (a) a price for the purchase of each of the construction plan elements, wherein the price may be determined using a zip code and price data that is present on the web site on the remote server system, and corresponds with the purchase of the construction plan elements in a geographical location within the zip code; and
      (b) a statement as to whether or not the construction plan elements meet predetermined environmental or efficiency criteria, or both; and
   (iv) generates:
      (a) a price schedule from the prices, wherein the price schedule includes a total cost for all of the construction plan elements corresponding to inserted parametric symbols, wherein the price schedule can include one or more construction plan elements, and wherein the price schedule can be immediately used on the local computer to place an order to purchase one or more construction plan elements that are present in the price schedule; and
      (b) a schedule of statements indicating whether or not each of the construction plan elements corresponding to inserted parametric symbols meets predetermined environmental or efficiency criteria, or both.

55. The system of claim 54 wherein the price schedule, the schedule stating whether or not the construction plan elements meet predetermined environmental or efficiency criteria, or both, or both schedules become inserted into the construction plan drawing.

56. The system of claim 54 wherein the schedule contains a list of the construction plan elements corresponding to inserted parametric symbols with corresponding prices or statements indicating whether or not the construction plan elements meet predetermined environmental or efficiency criteria, or both, or both such prices and statements.

57. The system of claim 54 wherein the architectural software design tool is a CAD software product.

58. The system of claim 54 wherein the construction plan elements are selected from a group comprising at least one of a window, a door and an acrylic glass block.

59. The system of claim 54 wherein the add-on computer software code additionally confirms that each inserted parametric symbol meets criteria of a building code.

60. The system of claim 54 wherein the system permits a user to place an order to purchase one or more of the construction plan elements that are present in one or both of the schedules.

61. The system of claim 54 wherein the order is placed using the local computer or the web site on the remote server, or both.

62. The system of claim 54 wherein the schedules include one or two construction plan elements.

63. The system of claim 54 wherein the schedules includes two or more construction plan elements.

64. The system of claim 54 wherein the construction plan drawing includes one or more walls, and wherein one or more of the inserted parametric symbols automatically aligns with a wall.

65. The system of claim 64 wherein the one or more inserted parametric symbols additionally automatically auto-embeds itself into the wall.

66. The system of claim 54 wherein the system has one or more selected parametric symbol values.

67. The system of claim 66 wherein the system permits one or more of the selected parametric symbol values to be modified after a corresponding parametric symbol is inserted into the construction plan drawing.

68. The system of claim 54 wherein, after the schedules are created, the system permits one or more changes to be made to one or more of the inserted parametric symbols, and the schedules to be automatically edited to correspond to the changes.

69. The system of claim 54 wherein the system permits one or both of the schedules created to be exported into a separate database.

70. The system of claim 54 wherein the web site is an online web site or a remote server system.

71. The system of claim 54 wherein a communication module is not employed.

72. The system of claim 54 wherein a communication module is employed.

73. An automated method for creating a schedule for one or more construction plan elements of a construction project that states whether or not the construction plan elements meet predetermined environmental or efficiency criteria, or both, comprising:
  (a) providing on a local computer an architectural software design tool and a construction plan drawing having at least one construction plan element, wherein the construction plan drawing is created with the architectural software design tool;
  (b) providing on the local computer an add-on computer software code that runs as an internal component within the architectural software design tool, and that includes a palette containing one or more parametric symbols, and optionally one or more corresponding parametric symbol values, wherein the palette includes at least one parametric symbol that corresponds with a construction plan element;
  (c) selecting one or more of the parametric symbols that is included in the palette for insertion into the construction plan drawing;
  (d) inserting one or more of the selected parametric symbols into the construction plan drawing;
  (e) using the add-on computer software code, transmitting data corresponding to the inserted parametric symbols from the local computer to a database, either directly or via an optional communication module;
  (f) using the add-on computer software code, accessing data from the database that includes data for construction plan elements corresponding to inserted parametric symbols, wherein the data states whether or not the construction plan elements meet predetermined environmental or efficiency criteria, or both; and
  (g) using the add-on computer software code, creating a schedule from the data, wherein the schedule states for construction plan elements corresponding to inserted parametric symbols whether or not the construction plan elements meet predetermined environmental or efficiency criteria, or both.

74. An automated system for creating a schedule for one or more construction plan elements of a construction project that states whether or not the construction plan elements meet predetermined environmental or efficiency criteria, or both, comprising:
  (a) a local computer;
  (b) an architectural software design tool, wherein the architectural software design tool provides on the local computer a construction plan drawing having at least one construction plan element;
  (c) a database including data for the construction plan elements, wherein the data states whether or not the construction plan elements meet predetermined environmental or efficiency criteria, or both; and
  (d) an add-on computer software code that runs as an internal component within the architectural software design tool on the local computer;
wherein the add-on computer software code has a palette that includes at least one parametric symbol that corresponds with a construction plan element, and that may be selected by a user for insertion into the construction plan drawing; and
wherein the add-on computer software code when executed by the local computer:
  (i) inserts at least one of the parametric symbols that are selected by a user into the construction plan drawing;
  (ii) transmits data corresponding to the inserted parametric symbols from the local computer to the database, either directly or via an optional communication module;
  (iii) receives from the database for construction plan elements corresponding to inserted parametric symbols a statement or other indication as to whether or not the construction plan elements meet predetermined environmental or efficiency criteria, or both, either directly or via an optional communication module; and
  (iv) generates a schedule from the statements, wherein the schedule includes a statement for construction plan elements corresponding to inserted parametric symbols indicating whether or not the construction plan elements meet predetermined environmental or efficiency criteria, or both.

75. An automated method for creating for one or more construction plan elements of a construction project both a price schedule and a schedule that states whether or not the construction plan elements meet predetermined environmental or efficiency criteria, or both, comprising:
  (a) providing on a local computer an architectural software design tool and a construction plan drawing having at least one construction plan element, wherein the construction plan drawing is created with the architectural software design tool;
  (b) providing on the local computer an add-on computer software code that runs as an internal component within the architectural software design tool, and that includes a palette containing one or more parametric symbols, and optionally one or more corresponding parametric symbol values, wherein the palette includes at least one parametric symbol that corresponds with a construction plan element;
  (c) selecting one or more of the parametric symbols that is included in the palette for insertion into the construction plan drawing;
  (d) optionally, selecting one or more parametric symbol values for one or more of the selected parametric symbols;
  (e) optionally, selecting one or more types of manufacturers or distributors for one or more of the selected parametric symbols;
  (f) inserting one or more of the selected parametric symbols into the construction plan drawing;
  (g) using the add-on computer software code, transmitting data corresponding to the inserted parametric symbols from the local computer to a database, either directly or via an optional communication module;
  (h) using the add-on computer software code, accessing price data from a database that includes price data for a purchase of construction plan elements corresponding to inserted parametric symbols and, using the add-on computer software code, accessing data from the database that states whether or not the construction plan elements meet predetermined environmental or efficiency criteria, or both;

(i) determining from the price data a price for construction plan elements corresponding to inserted parametric symbols; and (j) using the add-on computer software code when executed by the local computer:

(1) creating a price schedule from the prices, wherein the price schedule may include a total cost for all of the construction plan elements corresponding to inserted parametric symbols, wherein the price schedule can include one or more construction plan elements, and wherein the price schedule may be immediately used on the local computer to place an order to purchase one or more construction plan elements that are present in the price schedule; and (2) creating a schedule from the data that states whether or not the construction plan elements meet predetermined environmental or efficiency criteria, or both, wherein the schedule states for construction plan elements corresponding to inserted parametric symbols whether or not the construction plan elements meet predetermined environmental or efficiency criteria, or both.

76. An automated system for creating for one or more construction plan elements of a construction project both a price schedule and a schedule that states whether or not the construction plan elements meet predetermined environmental or efficiency criteria, or both, comprising:

(a) a local computer;

(b) an architectural software design tool, wherein the architectural software design tool provides on the local computer a construction plan drawing having at least one construction plan element;

(c) one or more databases for the construction plan elements including pricing data and data indicating whether or not the construction plan elements meet predetermined environmental or efficiency criteria, or both; and (d) an add-on computer software code that runs as an internal component within the architectural software design tool on the local computer;

wherein the add-on computer software code has a palette that includes at least one parametric symbol that corresponds with a construction plan element, and that may be selected by a user for insertion into the construction plan drawing; and wherein the add-on computer software code when executed by the local computer:

(i) inserts at least one of the parametric symbols that are selected by a user into the construction plan drawing;

(ii) transmits data corresponding to inserted parametric symbols from the local computer to the database;

(iii) receives from the database for construction plan elements corresponding to inserted parametric symbols:

(a) a price for the purchase of the construction plan elements, wherein the price may be determined using price data that is present in the database; and (b) a statement as to whether or not the construction plan elements meet predetermined environmental or efficiency criteria, or both; and (iv) generates:

(a) a price schedule from the prices, wherein the price schedule may include a total cost for all of the construction plan elements corresponding to inserted parametric symbols, wherein the price schedule can include one or more construction plan elements, and wherein the price schedule can be immediately used on the local computer to place an order to purchase one or more construction plan elements that are present in the price schedule; and (b) a schedule of statements indicating whether or not construction plan elements corresponding to inserted parametric symbols meet predetermined environmental or efficiency criteria, or both.

77. The method of claim 73 wherein the method may be implemented using an Internet, a LAN, a CD, a DVD or a physical storage medium.

78. The system of claim 74 wherein the system may be implemented using an Internet, a LAN, a CD, a DVD or a physical storage medium.

79. The method of claim 75 wherein the method may be implemented using an Internet, a LAN, a CD, a DVD or a physical storage medium.

80. The system of claim 76 wherein the system may be implemented using an Internet, a LAN, a CD, a DVD or a physical storage medium.

81. The method of claim 73 wherein the method may be implemented using an Internet, a LAN, a CD or a DVD.

82. The system of claim 74 wherein the system may be implemented using an Internet, a LAN, a CD or a DVD.

83. The method of claim 75 wherein the method may be implemented using an Internet, a LAN, a CD or a DVD.

84. The system of claim 76 wherein the system may be implemented using an Internet, a LAN, a CD or a DVD.

85. The method of claim 73 wherein the schedule additionally includes a reference number.

86. The system of claim 74 wherein the schedule additionally includes a reference number.

87. The method of claim 75 wherein the price schedule or schedule, or both, additionally includes a reference number.

88. The system of claim 76 wherein the price schedule or schedule, or both, additionally includes a reference number.

* * * * *